United States Patent
Okabe et al.

(10) Patent No.: US 7,907,247 B2
(45) Date of Patent: Mar. 15, 2011

(54) LIQUID CRYSTAL DISPLAY

(75) Inventors: Masato Okabe, Tokyo-to (JP); Naoko Sawatari, Tokyo-to (JP); Hideo Hama, Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 169 days.

(21) Appl. No.: 11/914,612

(22) PCT Filed: May 18, 2006

(86) PCT No.: PCT/JP2006/309959
§ 371 (c)(1),
(2), (4) Date: Nov. 16, 2007

(87) PCT Pub. No.: WO2006/123749
PCT Pub. Date: Nov. 23, 2006

(65) Prior Publication Data
US 2009/0051854 A1 Feb. 26, 2009

(30) Foreign Application Priority Data
May 19, 2005 (JP) .................. 2005-147327

(51) Int. Cl.
*C09K 19/02* (2006.01)
*G02F 1/141* (2006.01)
(52) U.S. Cl. .................. 349/172; 349/133; 349/135
(58) Field of Classification Search .................. 349/133, 349/135, 172
See application file for complete search history.

(56) References Cited

U.S. PATENT DOCUMENTS

| 4,783,148 | A |   | 11/1988 | Tsuboyama et al. |
|---|---|---|---|---|
| 5,262,882 | A |   | 11/1993 | Hikmet |
| 5,539,546 | A |   | 7/1996 | Koden et al. |
| 5,617,229 | A |   | 4/1997 | Yamamoto et al. |
| 5,808,716 | A | * | 9/1998 | Gass et al. ............ 349/124 |
| 5,812,230 | A |   | 9/1998 | Sakaigawa et al. |
| 5,880,803 | A |   | 3/1999 | Tamai et al. |
| 6,597,422 | B1 |  | 7/2003 | Funfschilling et al. |
| 7,326,449 | B2 |  | 2/2008 | Geisow et al. |
| 7,402,332 | B2 |  | 7/2008 | Sawatari et al. |

(Continued)

FOREIGN PATENT DOCUMENTS

EP 1 079 265 A2 2/2001

(Continued)

OTHER PUBLICATIONS

M. Okabe, et al; "23.3: A Novel Mono-Domain Alignment Method for Ferroelectric Liquid Crystal Applying to Half-V Shape Mode Field Sequential Color Displays" 2005 SID International Symposium, Boston, MA, May 24-27, 2005 pp. 1084-1087, XP007012241.

(Continued)

*Primary Examiner* — Wen-Ying P Chen
(74) *Attorney, Agent, or Firm* — Ladas & Parry LLP

(57) ABSTRACT

To provide a liquid crystal display, using a ferroelectric liquid crystal exhibiting mono-stability, which makes it possible to control the direction of the spontaneous polarization of the ferroelectric liquid crystal. The liquid crystal display includes a first alignment treatment substrate and a second alignment treatment substrate in which the first alignment treatment substrate and the second alignment treatment substrate have the first alignment layer and a reactive liquid crystal layer that face each other; and in which a ferroelectric liquid crystal is held between the first alignment layer and the reactive liquid crystal layer.

11 Claims, 7 Drawing Sheets

U.S. PATENT DOCUMENTS

| | | | |
|---|---|---|---|
| 2002/0085153 A1 | 7/2002 | Choi et al. | |
| 2003/0021913 A1 | 1/2003 | O'Neill et al. | |
| 2003/0156243 A1 | 8/2003 | Yoshihara et al. | |
| 2004/0041975 A1 | 3/2004 | Yoshihara et al. | |
| 2005/0233094 A1* | 10/2005 | Sawatari et al. | 428/1.1 |
| 2006/0082719 A1 | 4/2006 | Okabe et al. | |
| 2006/0083865 A1* | 4/2006 | Okabe et al. | 428/1.1 |
| 2006/0083868 A1* | 4/2006 | Sawatari et al. | 428/1.3 |
| 2008/0124493 A1 | 5/2008 | Sawatari et al. | |

FOREIGN PATENT DOCUMENTS

| | | |
|---|---|---|
| EP | 1 715 372 A1 | 10/2006 |
| JP | 62-182719 A | 8/1987 |
| JP | 62-275223 A | 11/1987 |
| JP | 63-077019 A | 4/1988 |
| JP | 01-105912 A | 4/1989 |
| JP | 04-234018 A | 8/1992 |
| JP | 7-64051 A | 3/1995 |
| JP | 7-199202 A | 8/1995 |
| JP | 7-239485 A | 9/1995 |
| JP | 2000-010076 A | 1/2000 |
| JP | 2001-142098 A | 5/2001 |
| JP | 2002-023164 A | 1/2002 |
| JP | 2002-532755 | 10/2002 |
| JP | 2003-005223 A | 1/2003 |
| JP | 2003-029237 | 1/2003 |
| JP | 2003-098529 A | 4/2003 |
| JP | 2003-172935 A | 6/2003 |
| JP | 2003-241226 | 8/2003 |
| JP | 2004-012543 A | 1/2004 |
| JP | 2004-013098 A | 1/2004 |
| JP | 2004-078099 A | 3/2004 |
| JP | 2004-109787 A | 4/2004 |
| JP | 2005-208353 A | 8/2005 |
| JP | 2005-234549 A | 9/2005 |
| JP | 2005-234550 A | 9/2005 |
| JP | 2005-258428 A | 9/2005 |
| JP | 2005-258430 A | 9/2005 |
| JP | 2006-323223 A | 11/2006 |
| WO | 02/03131 A1 | 1/2002 |
| WO | 2006/123749 A1 | 11/2006 |

OTHER PUBLICATIONS

European Search Report: PCT/JP2006309959.

Toshiaki Nonaka, et al; "Material characteristics of an active matrix LCD based upon chiral smectics;" Liquid Crystals, 1999, vol. 26, No. 11, pp. 1599-1602.

J.S. Patel, et al; "Alignment of liquid crystals which exhibit cholesteric to smectic C* phase transitions" Journal Applied Physics 59(7), Apr. 1, 1986.

Yuji Murakami, et al; "Intrinsic Half-V-Mode Ferroelectric Liquid Crystal Displays Fabricated Using Hybrid Alignment Exhibiting High Contrast Ratio and High Reliability without DC Voltage Application to Remove Layer Degeneracy and Their Electro-Optic Characteristics", Jpn. J. Appl. Phys., vol. 42, pp. 2759-2761; May 2003 (exact date not given).

International Search Report: PCT/JP2006/309959.

International Search Report PCT/JP2006/310068.

USPTO-OA mailed Oct. 2, 2008 for Co-Pending U.S. Appl. No. 11/437,778.

USPTO-OA mailed Jun. 3, 2009 for Co-Pending U.S. Appl. No. 11/437,778.

USPTO-OA mailed May 17, 2010 for Co-Pending U.S. Appl. No. 11/914,640.

* cited by examiner

FIG. 1
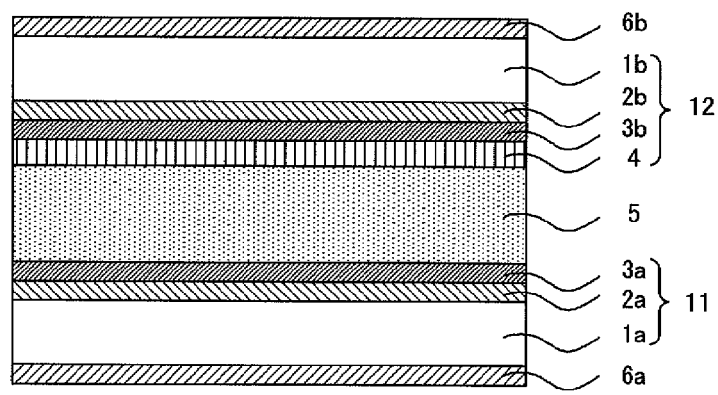
FIG. 2A
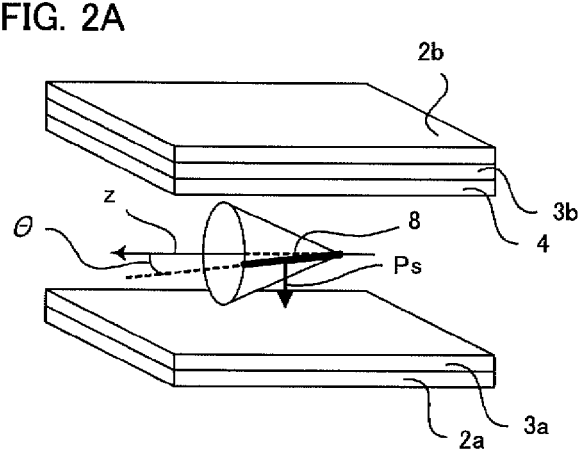
FIG. 2B
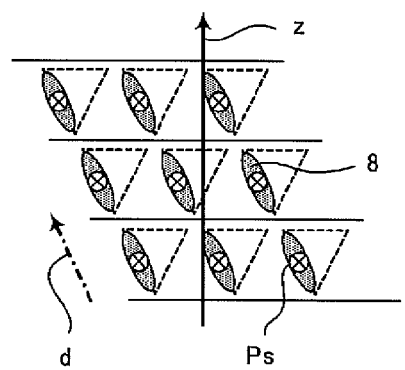
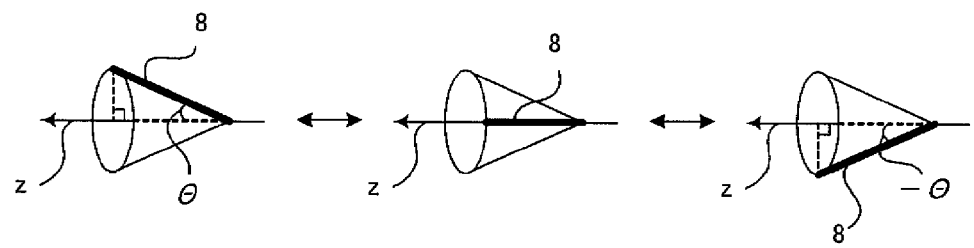
FIG. 3A   FIG. 3B   FIG. 3C FIG. 7
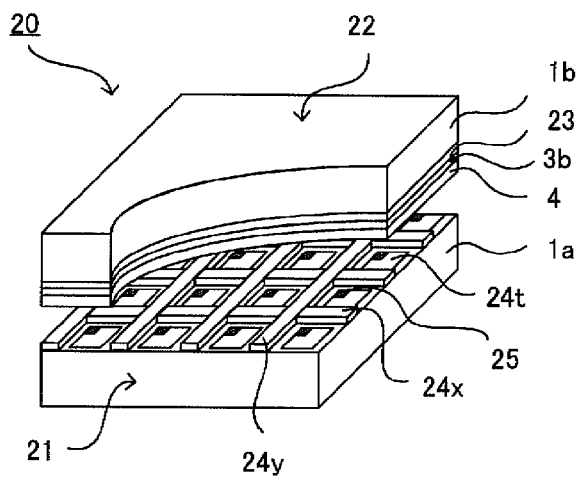
FIG. 8
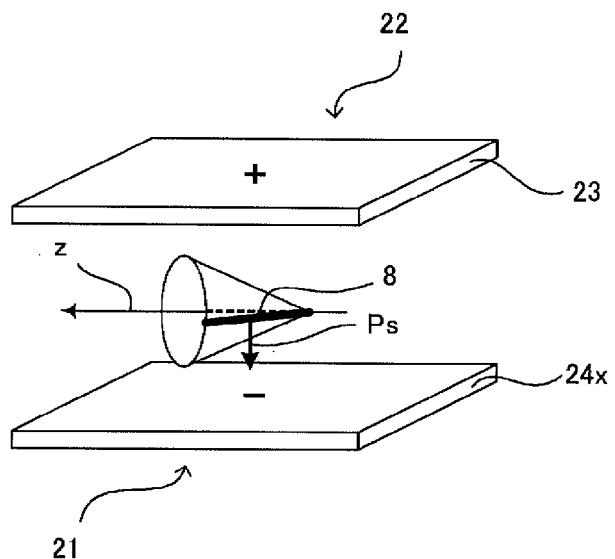
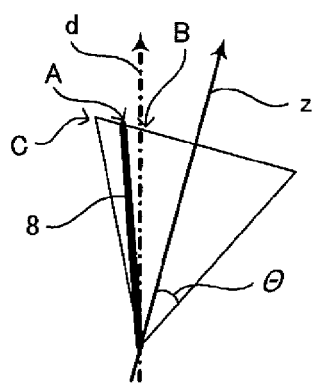
FIG. 9A
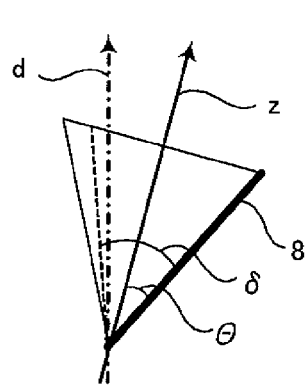
FIG. 9B
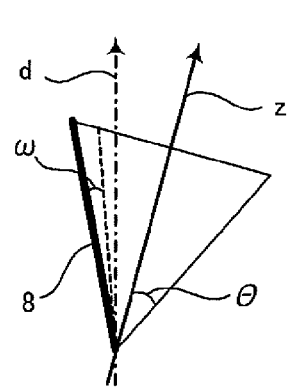
FIG. 9C

LIQUID CRYSTAL DISPLAY

TECHNICAL FIELD

The present invention relates to a liquid crystal display using a mono-stability type ferroelectric liquid crystal having spontaneous polarization.

BACKGROUND ART

Since liquid crystal displays have features of being thin, low in power consumption and others, the use thereof has been expanding in various articles from large-sized displays to portable information terminals and the development thereof has been actively made. Conventionally, for liquid crystal displays, a TN system, an STN multiplex driving system, an active matrix driving system in which thin film transistors (TFTs) are used in TN, and others have been developed and made practicable. However, since nematic liquid crystal is used therein, the response speed of the liquid crystal material is as small as several milliseconds to several tens of milliseconds and it cannot be said that these sufficiently cope with display of moving images.

Ferroelectric liquid crystal (FLC) exhibits a very fast response in order of microseconds, and thus FLC is a liquid crystal suitable for high-speed devices. About ferroelectric liquid crystal, there is well known a bistable liquid crystal which has two stable states when no voltage is applied thereto and is suggested by Clark and Lagerwall (FIG. 12 upper graph). However, the liquid crystal has a problem that the liquid crystal has memory properties but gray scale display cannot be attained since the switching thereof is limited to two states, namely, bright and dark states.

In recent years, attention has been paid to ferroelectric liquid crystal in which the liquid crystal layer thereof is stable in a single state (hereinafter referred to as "monostable") when no voltage is applied thereto as a liquid crystal making it possible to attain gray scale display by the matter that the director (the inclination of the molecule axis) of the liquid crystal is continuously changed by a change in applied voltage so as to analogue-modulate the light transmission thereof (Non-Patent Document 1, FIG. 12 lower graphs). As the liquid crystal showing the mono-stability, ferroelectric liquid crystals having the phase change of cholesteric phase (Ch)-chiral smectic C phase (SmC*) without the transition to the smectic A (SmA) phase in the temperature lowering process are generally used (FIG. 11 upper part).

On the other hand, as the ferroelectric liquid crystal, there is a material having the phase change of cholesteric phase (Ch)-smectic A phase (SmA)-chiral smectic C phase (SmC*) so as to show the SmC* phase via the SmA phase in the temperature lowering process. Among the ferroelectric liquid crystal material reported so far, most of them are those having the latter phase sequence of passing through the SmA phase compared with the former material which does not pass the SmA phase. It is known that the latter ferroelectric liquid crystal having the phase sequence of passing through SmA phase in general has two stable states with respect to one layer normal line so as to show the bi-stability (FIG. 11 lower part).

In recent years, color liquid crystal displays have been actively developed. The method for realizing color display is generally classified into a color filter system and a field sequential color system. The color filter system is a system of using a white light source as a back light and attaching a micro color filter in R, G or B color to each pixel, thereby realizing color display. On the other hand, the field sequential color system is a system of switching a back light into R, G, B, R, G, B . . . with time, and opening and shutting a black and white shutter of a ferroelectric liquid crystal in synchronization therewith to mix the colors with time by after image effect on the retina, thereby realizing color display. This field sequential color system makes it possible to attain color display in each pixel, and does not require any color filter low in transmission. As a result, this system is useful since the system is capable of attaining bright and highly precise color display and realizing low power consumption and low costs.

The field sequential color system is a system in which each pixel is subjected to time sharing; it is therefore necessary for the liquid crystal as the black and white shutter to have high speed response properties in order to give good moving image display properties. If ferroelectric liquid crystal is used, this problem can be solved. The ferroelectric liquid crystal used at this time is in particular desirably a liquid crystal exhibiting mono-stability in order to make gradation display based on analogue modulation possible and realize highly precise color display, as described above.

Herein, FIG. 13 shows a conceptual diagram of a driving sequence of a liquid crystal display based on a field sequential color system. In FIG. 13, it is supposed that the voltage applied to the liquid crystal display is set into the range of 0 to ±V (V), data-writing scanning is attained through a plus-polarized voltage, and data-erasing scanning is attained through a minus-polarized voltage. It is also supposed that a ferroelectric liquid crystal exhibiting mono-stability is used.

As illustrated in FIGS. 10A and 10B, the response of the ferroelectric liquid crystal exhibiting mono-stability is classified to a case that the liquid crystal gives a response to a plus-polarized voltage to turn into a bright state (FIG. 10A), and a case that the liquid crystal gives a response to a minus-polarized voltage to turn into a bright state (FIG. 10B). As illustrated in FIG. 13, therefore, in the case of using the ferroelectric liquid crystal exhibiting the response illustrated in FIG. 10A (liquid crystal response 1), the liquid crystal turns into a bright state when a plus-polarized voltage is applied thereto. In the case of using the ferroelectric liquid crystal exhibiting the response illustrated in FIG. 10B (liquid crystal response 2), the liquid crystal turns into a bright state when a minus-polarized voltage is applied thereto.

In a field sequential color system, scanning is performed in after another line. Thus, when scanning is performed from a first line to an $L^{th}$ line, a time gap is generated between the writing scanning (the application of a plus-polarized voltage) on the first line and the writing scanning (the application of a plus-polarized voltage) on the $L^{th}$ line. Similarly, a time gap is generated between the erasing scanning (the application of a minus-polarized voltage) on the first line and the erasing scanning (the application of a minus-polarized voltage) on the $L^{th}$ line (an applied voltage (1) and an applied voltage (L) in FIG. 13).

In FIG. 13, "+(R)" represents a matter that writing scanning (the application of a plus-polarized voltage) is performed in synchronization with a red (R) back light, and "−(R)" represents a matter that erasing scanning (the application of a minus-polarized voltage) is performed in synchronization with the red (R) back light. Similarly, "+(G)", "−(G)", "+(B)", and "−(B)" represent matters that the scanning operations are performed in synchronization with a green (G) back light and a blue (B) back light, respectively.

As described above, in a field sequential color system, writing scanning and erasing scanning are performed in synchronization with the switching of the used back light into R, G, B, . . . with time, thereby causing the ferroelectric liquid crystal to respond. Accordingly, when scanning is performed in synchronization with the back light R, the liquid crystal turns into a bright state during the lighting of the back light R in each of the writing scanning (+(R)) on the first line and the writing scanning (+(R)) on the $L^{th}$ line in the case of using the ferroelectric liquid crystal exhibiting the liquid crystal response 1. On the other hand, in the case of using the ferroelectric liquid crystal exhibiting the liquid crystal response 2, a time gap is generated in writing scanning (+(R) and erasing scanning (−(R)) between the first line and the $L^{th}$ line. Accordingly, by the erasing scanning (−(R)) on the $L^{th}$ line in synchronism with the back light R, the liquid crystal turns unfavorably into a bright state when the back light G lights (broad line frames in FIG. 13). When scanning is performed in synchronization with the back light G, erasing scanning (−(G)) on the $L^{th}$ line in synchronization with the back light G causes the following: the liquid crystal turns unfavorably into a bright state when the back light B lights (broad line frames in FIG. 13).

In FIG. 13, "Bright (R)" represents a matter that the liquid crystal turns into a bright state by scanning in synchronization with the back light R (red), and "Dark" represents a matter that the liquid crystal turns into a dark state by scanning in synchronization with each of the back light R (red), G (green) and B (blue). In the same manner, "Bright (G)" and "Bright (B)" represent matters that the liquid crystal turns into a bright state by scanning in synchronization with the back lights G (green) and B (blue), respectively.

It is usually decided that writing scanning and erasing scanning are each performed by either one of plus-polarized and minus-polarized voltages; therefore, in order to avoid the above-mentioned inconvenience, it is sufficient to determine the response of the ferroelectric liquid crystal exhibiting mono-stability. This response of the ferroelectric liquid crystal is concerned with the spontaneous polarization of the ferroelectric liquid crystal. The direction of the spontaneous polarization is changed by the polarization of applied voltage. For this reason, when the direction of the spontaneous polarization can be known, the response of the ferroelectric liquid crystal can be determined.

Ferroelectric liquid crystal has a higher molecule order than nematic liquid crystal, so as not to be aligned with ease. In particular, in ferroelectric liquid crystal which exits by way of no SmA phase, two domains different in the layer normal line direction (referred to as the "double domains" hereinafter) are generated (the upper part in FIG. 11). In such double domains, white-black reversed display is generated when the liquid crystal is driven. This becomes a serious problem. For this reason, various alignment treatments are being investigated.

As a method for overcoming the double domains, known is, for example, the electric field induced technique of heating a liquid crystal cell to a temperature not lower than the cholesteric phase, and cooling the liquid crystal cell gradually while applying a DC voltage thereto (see Non-Patent Document 2). When this electric field induced technique is used, the direction of the spontaneous polarization cannot be controlled in accordance with the direction of the applied electric field. According to this method, however, if the temperature is raised again to the phase transition point or higher, alignment disorder is generated. Moreover, there are caused a problem that alignment disorder is generated in the region on which the electric field does not act between pixel electrodes, and other problems.

Moreover, disclosed is, for example, a method of: subjecting upper and lower alignment layers, which have no mono-stability, to photo alignment treatment; coating a nematic liquid crystal onto each of the alignment layers to be aligned and fixed, thereby forming a nematic liquid crystal layer; and causing this nematic liquid crystal layer to act as an alignment layer, thereby aligning the ferroelectric liquid crystal without generating any alignment defect (see Patent Document 1).

However, according to this method, the ferroelectric liquid crystal is aligned without applying any electric field thereto; thus, the direction of the spontaneous polarization cannot be controlled.

Patent Document 1: Japanese Patent Application National Publication 2002-532755

Non-Patent Document 1: NONAKA, T., LI, J., OGAWA, A., HORNUNG, B., SCHMIDT, W., WINGEN, R., and DUBAL, H., 1999, Liq. Cryst., 26, 1599.

Non-Patent Document 2: PATEL, J., and GOODBY, J. W., 1986, J. Appl. Phys., 59, 2355.

DISCLOSURE OF THE INVENTION

Problems to be Solved by the Invention

The present invention has been made in light of the above-mentioned problems, and a main object thereof is to provide a liquid crystal display, using a ferroelectric liquid crystal exhibiting mono-stability, which makes it possible to control the direction of the spontaneous polarization of the ferroelectric liquid crystal.

Means for Solving the Problems

To attain the object, the present invention provides a liquid crystal display comprising: a first alignment treatment substrate having a first substrate, a first electrode layer formed on the first substrate, and a first alignment layer formed on the first electrode layer; and a second alignment treatment substrate having a second substrate, a second electrode layer formed on the second substrate, a second alignment layer formed on the second electrode layer, and a reactive liquid crystal layer formed on the second alignment layer and obtained by fixing a reactive liquid crystal; in which the first alignment treatment substrate and the second alignment treatment substrate are provided to have the first alignment layer and the reactive liquid crystal layer face to each other; and in which a ferroelectric liquid crystal is held between the first alignment layer and the reactive liquid crystal layer; characterized in that the ferroelectric liquid crystal exhibits mono-stability, and further characterized in that, when a negative voltage is applied to the second electrode layer, a molecular direction of the ferroelectric liquid crystal is changed by about 2 times a tilt angle of the ferroelectric liquid crystal parallel to a surface of the first alignment treatment substrate.

According to the invention, the reactive liquid crystal is aligned by action of the second alignment layer, and the reactive liquid crystal layer functions as an alignment layer for aligning the ferroelectric liquid crystal. The reactive liquid crystal is relatively similar to the ferroelectric liquid crystal in structure; thus, the reactive liquid crystal interacts strongly with the ferroelectric liquid crystal. As a result, the alignment can be more effectively controlled in the case of using only the alignment layer. Accordingly, the alignment of the ferroelectric liquid crystal can be made into a mono-stability state by forming the reactive liquid crystal layer onto any one of the upper and lower alignment layers.

Furthermore, the reactive liquid crystal layer appears to have a tendency of exhibiting a stronger plus polarity than alignment layers used generally in liquid crystal displays, for example, a photo alignment layer or a rubbing alignment layer. For this reason, the side of the reactive liquid crystal layer and the side of the first alignment layer side turn into plus and minus polarities, respectively, in a state that no voltage is applied to the liquid crystal display, so that the spontaneous polarization of the ferroelectric liquid crystal is directed to the side of the first alignment layer. It is therefore possible to control the direction of the spontaneous polarization of the ferroelectric liquid crystal in the invention. When a negative voltage is applied to the second electrode layer, the direction of the liquid crystal molecules is changed by about 2 times the tilt angle in the ferroelectric liquid crystal used in the present invention. Therefore, when the liquid crystal display of the invention is displayed by a field sequential color system, the direction of the spontaneous polarization of the liquid crystal molecules can be controlled, thereby avoiding the inconveniences as described in the above-mentioned column "Background Art".

In the present invention, it is preferable that the above-mentioned reactive liquid crystal shows a nematic phase. The nematic phase allows the alignment control relatively easily among the liquid crystal phases.

Moreover, in the present invention, it is preferable that the reactive liquid crystal has a polymerizable liquid crystal monomer. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

At that time, it is preferable that the above-mentioned polymerizable liquid crystal monomer is a monoacrylate monomer or a diacrylate monomer. The monoacrylate monomer or the diacrylate monomer can easily be polymerized while preferably maintaining the aligned state.

Also at that time, it is preferable that the diacrylate monomer is a compound represented by the below-mentioned formula (1):

Here, X in the formula is a hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro; and m is an integer in a range of 2 to 20.

Still further, in the present invention, it is preferable that the above-mentioned first alignment layer and the above-mentioned second alignment layer is a photo alignment layer. Since the photo alignment treatment is a non contact alignment treatment, it is advantageous in that the quantitative alignment treatment control can be enabled without generation of the static electricity or the dust, and thus it is advantageous.

At that time, it is preferable that a constituent material for the above-mentioned photo alignment layer is a photoreactive type material to exhibit anisotropy to the above-mentioned photo alignment layer by generating a photoreaction, or a photo-isomerization type material including a photo-isomerization-reactive compound to exhibit anisotropy to the above-mentioned photo alignment layer by generating a photo-isomerization reaction. By using such a material, the anisotropy can be exhibited easily to the photo alignment layer.

In the invention, it is preferred that the first alignment treatment substrate is a TFT substrate having a thin film transistor (TFT) formed on the first substrate and the second alignment treatment substrate is a common electrode sub-

[Chemical Formula 1]

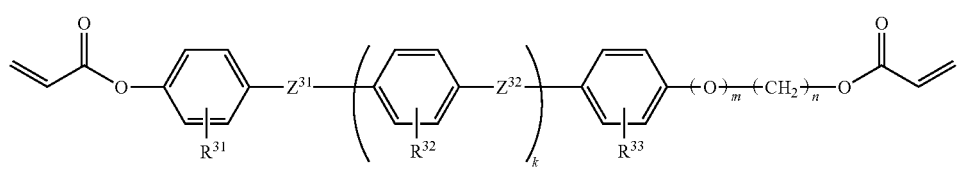

(1)

Here, $Z^{31}$ and $Z^{32}$ in the formula are each independently and directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; $R^{31}$, $R^{32}$ and $R^{33}$ are each independently a hydrogen or an alkyl having 1 to 5 carbon atoms; K and m is each 0 or 1; and n is an integer in a range of 2 to 8.

Still further, it is also preferable that the above-mentioned diacrylate monomer is a compound represented by the below-mentioned formula (2):

strate in which the second electrode layer is a common electrode. Such a structure makes it possible that when the switch of the TFT elements turns off, light leakage is prevented near the gate electrode.

The liquid crystal display in the present invention is preferably driven by an active matrix system using a thin film transistor. This is because the adoption of the active matrix system using TFT elements makes it possible to switch on or off the target pixels surely to give high-quality display.

[Chemical Formula 2]

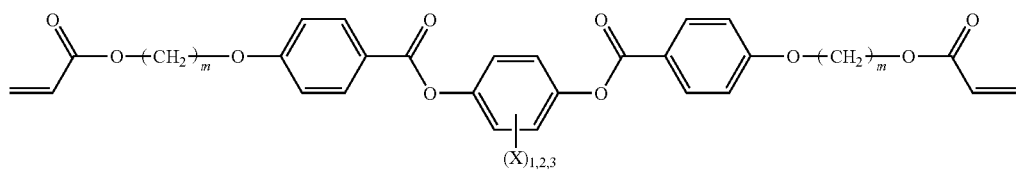

(2)

Moreover, the liquid crystal display of the present invention is suited to be displayed by a field sequential color system. This is because the ferroelectric liquid crystal shows monostability and enables gray scale display, and also because a highly precise, low-power consumption and low cost display of color moving images with a wide viewing angle can be realized by displaying the field sequential color system.

EFFECTS OF THE INVENTION

The invention produces an advantageous effect that the direction of the spontaneous polarization of the ferroelectric liquid crystal can be controlled by use of a tendency that the reactive liquid crystal layer has a stronger plus polarity than the first alignment layer.

BRIEF DESCRIPTION OF THE DRAWINGS

FIG. 1 is a schematic sectional view illustrating one example of the liquid crystal display of the present invention.

FIGS. 2A and 2B are each a schematic view illustrating an example of the alignment state of a ferroelectric liquid crystal.

FIGS. 3A to 3C are each a schematic diagram showing the behavior of the liquid crystal molecule.

FIG. 7 is a schematic perspective view illustrating an example of the liquid crystal display of the invention.

FIG. 8 is an explanatory view illustrating the spontaneous polarization of a ferroelectric liquid crystal.

FIGS. 9A to 9C are each a schematic view illustrating another example of the alignment state of the ferroelectric liquid crystal.

EXPLANATION OF REFERENCE

Figure 4:
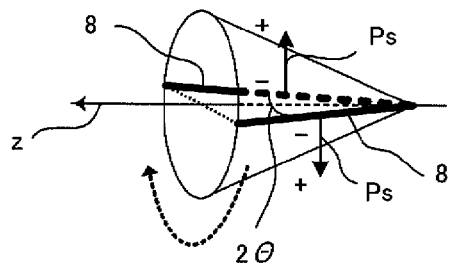
FIG. 4 is an explanatory view illustrating the spontaneous polarization of a ferroelectric liquid crystal.

1a: first substrate
1b: second substrate
2a: first electrode layer
2b: second electrode layer
3a: first alignment layer
3b: second alignment layer
4: reactive liquid crystal layer
5: liquid crystal layer
8: liquid crystal molecule
d: alignment treatment direction
z: layer normal line
Ps: spontaneous polarization

BEST MODE FOR CARRYING OUT THE INVENTION

Hereinafter, a liquid crystal display of the present invention will be explained in detail.

A liquid crystal display of the present invention comprises: a first alignment treatment substrate having a first substrate, a first electrode layer formed on the first substrate, and a first alignment layer formed on the first electrode layer; and a second alignment treatment substrate having a second substrate, a second electrode layer formed on the second substrate, a second alignment layer formed on the second electrode layer, and a reactive liquid crystal layer formed on the second alignment layer and obtained by fixing a reactive liquid crystal; in which the first alignment treatment substrate and the second alignment treatment substrate are provided to have the first alignment layer and the reactive liquid crystal layer face to each other; and in which a ferroelectric liquid crystal is held between the first alignment layer and the reactive liquid crystal layer; characterized in that the ferroelectric liquid crystal exhibits mono-stability, and further characterized in that, when a negative voltage is applied to the second electrode layer, a molecular direction of the ferroelectric liquid crystal is changed by about 2 times a tilt angle of the ferroelectric liquid crystal parallel to a surface of the first alignment treatment substrate.

With reference to the drawings, the liquid crystal display of the invention will be described.

FIG. 1 is a schematic sectional view illustrating an example of the liquid crystal display of the invention. In the liquid crystal display illustrated in FIG. 1, a first alignment treatment substrate 11 in which a first electrode layer 2a and a first alignment layer 3a are successively formed on a first substrate 1a, and a second alignment treatment substrate 12 in which a second electrode layer 2b, a second alignment layer 3b and a reactive liquid crystal layer 4 are successively formed on a second substrate 1b are opposed to each other, and a ferroelectric liquid crystal is held between the first alignment layer 3a of the first alignment treatment substrate 11 and the reactive liquid crystal layer 4 of the second alignment treatment substrate 12 to constitute a liquid crystal layer 5.

Since the reactive liquid crystal layer 4 is formed on the second alignment layer 3b, the reactive liquid crystal which constitutes the reactive liquid crystal layer 4 is aligned by action of the second alignment layer 3b. This reactive liquid crystal is polymerized by, for example, ultraviolet rays so that the alignment state of the reactive liquid crystal is fixed, thereby forming the reactive liquid crystal layer 4. Since the reactive liquid crystal layer 4 is a layer in which the alignment state of the reactive liquid crystal is fixed in this manner, the layer 4 functions as an alignment layer for aligning the ferroelectric liquid crystal constituting the liquid crystal layer 5. Furthermore, the reactive liquid crystal, which constitutes the reactive liquid crystal layer, interacts strongly with the ferroelectric liquid crystal since the reactive liquid crystal has a structure relatively similar to that of the ferroelectric liquid crystal. Thus, the alignment can be more effectively controlled than in the case of using only the alignment layer.

An example of the alignment state of the ferroelectric liquid crystal used in the invention is illustrated in FIGS. 2A to 2B. In general, in a liquid crystal display using a ferroelectric liquid crystal, two opposite alignment layers are provided to make alignment treatment directions of the individual layers parallel to each other. Thus, as illustrated in FIG. 2B, liquid crystal molecules 8 are aligned along an alignment treatment direction d of the first alignment layer and the second alignment layer (the reactive liquid crystal layer) in the state that no voltage is applied to the liquid crystal molecules. As a result, the liquid crystal molecules turn into a uniform alignment state. When the reactive liquid crystal layer is formed on one of the upper and lower alignment layers in this way, the alignment of the ferroelectric liquid crystal can be made into a mono-stability state without generating any alignment defect. In short, the ferroelectric liquid crystal exhibits mono-stability. Moreover, the invention has the following advantage: the alignment treatment is attained by use of the alignment layers and the reactive liquid crystal layer without depending on the electric field induced technique; therefore, even if the temperature is raised to the phase transition temperature or higher, the alignment thereof is maintained so that the generation of alignment defects can be restrained.

In FIGS. 3A to 3C, in the ferroelectric liquid crystal, each of the liquid crystal molecules 8 is inclined from a layer normal line z, and rotates along the edge line of a cone having a bottom plane perpendicular to the layer normal line z. In this cone, the inclination angle of the liquid crystal molecules 8 to the layer normal line z is defined as the tilt angle θ.

The wording "exhibiting mono-stability" means that the state of a ferroelectric liquid crystal is stabilized in a single state when no voltage is applied thereto. Specifically, as illustrated in FIGS. 3A to 3C, each of the liquid crystal molecules 8 can move on the cone between two states that the molecule is inclined by tilt angles of ±θ to the layer normal line z; the wording means that the liquid crystal molecule 8 is stabilized in any one state between the states on the cone when no voltage is applied thereto.

The inventors made experiments described below in order to examine the direction of the spontaneous polarization of the ferroelectric liquid crystal on the basis of the polarity of the voltage applied thereto.

First, a liquid crystal display was formed, in which a ferroelectric liquid crystal was held between a photo alignment layer and a reactive liquid crystal layer. A 2% by mass solution of a photo-dimerization reaction type photo alignment layer material (tradename: ROP 103, manufactured by Rolic Technologies Ltd.) in cyclopentanone was applied onto two glass substrates, each coated with ITO, by spin coating at a rotation number of 4000 rpm for 30 seconds. The resultants were dried at 130° C. on a hot plate for 15 minutes, and were then exposed to polarized ultraviolet rays at 25° C. at 100 mJ/cm². Furthermore, a 2% by mass solution of a reactive liquid crystal (trade name: ROF 5101, manufactured by Rolic Technologies Ltd.), containing an acrylate monomer, in cyclopentanone was applied onto one of the glass substrates by spin coating at a rotation number of 4000 rpm for 30 seconds, so as to form a laminate. The laminate was dried at 55° C. for 3 minutes. Thereafter, the resultant was exposed to non-polarized ultraviolet rays at 55° C. at 1000 mJ/cm². Thereafter, spacers 1.5 μm in size were scattered onto one of the substrates. A sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to the electrode layer of the reactive liquid crystal layer side, the molecular direction of the ferroelectric liquid crystal was changed by about 2 times the tilt angle. About approximately 75% of the whole of the molecules of the ferroelectric liquid crystal, the molecular direction was changed by about 2 times the tilt angle.

Liquid crystal displays, each in which a ferroelectric liquid crystal was held between a photo alignment layer and a reactive liquid crystal layer in the same manner as described above were produced while varying the kind of the photo alignment layer material, the kind of the reactive liquid crystal, or a combination thereof. As a result, the same results as described above were obtained.

Next, a liquid crystal display was formed, in which a ferroelectric liquid crystal was held between a pair of photo alignment layers. A 2% by mass solution of a photo-dimerization reaction type photo alignment layer material (trade name: ROP 103, manufactured by Rolic Technologies Ltd.) in cyclopentanone was applied onto two glass substrates, each coated with ITO, by spin coating at a rotation number of 4000 rpm for 30 seconds. The resultants were dried at 130° C. on a hot plate for 15 minutes, and were then exposed to polarized ultraviolet rays at 25° C. at 100 mJ/cm². Thereafter, spacers 1.5 μm in size were scattered onto one of the substrates. A sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to one of the electrode layers, the direction of a portion of the molecules of the ferroelectric liquid crystal was changed by about 2 times the tilt angle. However, the direction of another portion of the molecules of the ferroelectric liquid crystal was not changed. About approximately 50% of the whole of the molecules of the ferroelectric liquid crystal, the molecular direction was changed by approximately 2 times the tilt angle.

Liquid crystal displays, each in which a ferroelectric liquid crystal was held between a pair of photo alignment layers in the same manner as described above were produced while varying the kinds of materials of the photo alignment layers, or a combination thereof. As a result, the same results as described above were obtained.

It has been found out from the above-mentioned results of the experiments that the reactive liquid crystal layer tends to have a stronger plus polarity than the photo alignment layers.

As described above, it appears that a reactive liquid crystal layer tends to have a stronger plus polarity than alignment layers used generally in liquid crystal displays, for example, alignment layers subjected to photo alignment treatment or rubbing treatment. As illustrated in FIG. 2A, therefore, the reactive liquid crystal layer 4 has a stronger plus polarity than the first alignment layer 3a in the state that no voltage is applied thereto, so that the spontaneous polarization Ps of the liquid crystal molecules 8 is directed to the side of the first alignment layer 3a.

As illustrated in FIG. 4, about the spontaneous polarization Ps of the liquid crystal molecules 8, the tip of the arrow thereof has plus polarity. In FIG. 2A, the first substrate of the first alignment treatment substrate is omitted, and in the liquid crystal layer only the liquid crystal molecules 8 are illustrated.

FIG. 2B is a schematic view illustrating the alignment state of the liquid crystal molecules from the top side in FIG. 2A, in which the alignment state of the liquid crystal molecules 8 is uniform and the spontaneous polarization Ps thereof is directed from the front side of the drawing paper to the back side of the drawing paper (x marks in FIG. 2B).

Figure 5A:
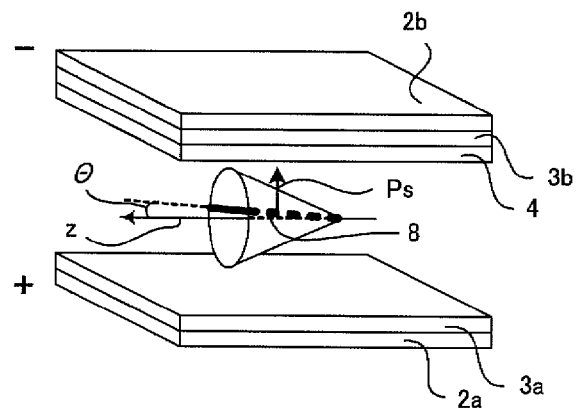
FIGS. 5A and 5B are each a schematic view illustrating another example of the alignment state of the ferroelectric liquid crystal.
Figure 5B:
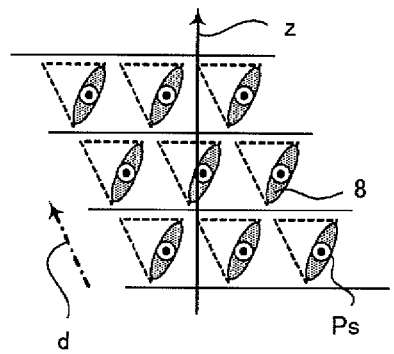

An example of the alignment state of the ferroelectric liquid crystal when a voltage is applied thereto in the invention is illustrated in FIGS. 5A and 5B. As illustrated in FIG. 5A, when the positive voltage is applied to the first electrode layer 2a and the negative voltage to the second electrode layer 2b, the spontaneous polarization Ps of the liquid crystal molecules 8 is directed to the side of the reactive liquid crystal layer 4 by the effect of the polarity of the applied voltage.

In FIG. 5A, the second substrate of the second alignment treatment substrate is omitted, and in the liquid crystal layer only the liquid crystal molecules 8 are illustrated.

FIG. 5B is a schematic view illustrating the alignment state of the liquid crystal molecules from the top side in FIG. 5A, in which the alignment state of the liquid crystal molecules 8 is uniform and the spontaneous polarization Ps thereof is directed from the back side of the drawing paper to the front side of the drawing paper (● marks in FIG. 5B).

Furthermore, when a negative voltage is applied to the first electrode layer and a positive voltage to the second electrode layer, the spontaneous polarization Ps of the liquid crystal molecules 8 is directed to the side of the first alignment layer 3a by the effect of the polarity of the applied voltage, as illustrated in FIG. 2A. In this case, the liquid crystal molecules turn into the same alignment state as in the non-voltage-applying state (FIG. 2B).

When the liquid crystal display is made from the non-voltage-applying state or the state when the positive voltage is applied to the second electrode layer (FIGS. 2A and 2B) to the state when the minus voltage is applied to the second electrode layer (FIGS. 5A and 5B), the liquid crystal molecules 8 are rotated by an angle of about 2θ, as illustrated in FIG. 4, by repulsion between the minus polarity of this applied voltage and the minus polarity of the spontaneous polarization of the liquid crystal molecules. In other words, when a negative voltage is applied to the second electrode layer, the molecular direction of the ferroelectric liquid crystal is changed, parallel to the first alignment treatment substrate surface, by about 2 times the tilt angle θ of the ferroelectric liquid crystal.

As described above, in the invention, the direction of the spontaneous polarization of the liquid crystal molecules can be controlled by use of the tendency that the reactive liquid crystal layer has a stronger plus polarity than the first alignment layer.

When a negative voltage is applied to the second electrode layer, the percentage of the ferroelectric liquid crystal molecules in which the molecular direction thereof is changed by about 2 times the tilt angle is preferably 80% or more, more preferably 90% or more, and most preferably 95% or more. When the percentage is in the above-mentioned range, a good contrast ratio can be obtained.

The above-mentioned percentage can be measured as follows:

As illustrated in, for example, FIG. 1, polarizing plates 6a and 6b are set up outside the first alignment treatment substrate 11 and the second alignment treatment substrate 12, respectively, and light is caused to go into the side of the polarizing plate 6a and caused to go out from the side of the polarizing plate 6b. The two polarizing plates 6a and 6b are provided to make the polarizing axes of the individual plates substantially perpendicular to each other and further make the polarizing axis of the polarizing plate 6a substantially parallel to the alignment treatment direction (the alignment direction of the liquid crystal molecules) of the first alignment layer 3a. In a non-voltage-applying state, the linearly polarized light transmitted through the polarizing plate 6a is consistent with the alignment direction of the liquid crystal molecules; therefore, the refractive index anisotropy of the liquid crystal molecules is not expressed so that the linearly polarized light transmitted through the polarizing plate 6a passes, as it is, through the liquid crystal molecules and is then intercepted by the polarizing plate 6b. As a result, the liquid crystal display turns into a dark state. On the other hand, in a voltage-applying state, the liquid crystal molecules move on the cones so that the linearly polarized light transmitted through the polarizing plate 6a and the alignment direction of the liquid crystal molecules come to have a predetermined angle. Accordingly, the linearly polarized light transmitted through the polarizing plate 6a is turned to elliptically polarized light by the birefringence of the liquid crystal molecules. Out of rays of this elliptically polarized light, only linearly polarized light consistent with the polarizing axis of the polarizing plate 6b is transmitted through the polarizing plate 6b, so that the liquid crystal display turns into a bright state.

For this reason, in the case that a negative voltage is applied to the second electrode layer, a bright state is obtained when the molecular direction of the ferroelectric liquid crystal is changed by about 2 times the tilt angle. On the other hand, in the case that a negative voltage is applied to the second electrode layer, for example, the ferroelectric liquid crystal molecules having a molecular direction not changed are partially present in some case. In this case, a dark state is partially obtained. Accordingly, from the area ratio between the black and the white in a black and white (dark and bright) display obtained at the time of the application of a voltage, the ratio of the ferroelectric liquid crystal molecules where their molecular direction is changed by about 2 times the tilt angle when a negative voltage is applied to the second electrode can be calculated.

As illustrated in FIG. 1, in the invention, the polarizing plates 6a and 6b may be provided outside the first alignment treatment substrate 11 and the second alignment treatment substrate 12, respectively. This manner makes it possible to convert incident light to linearly polarized light and cause the liquid crystal display to transmit only light polarized to the alignment direction of the liquid crystal molecules. The polarizing plates 6a and 6b are provided in such a manner that their polarizing axes are twisted at 90°. This manner makes it possible to control the optical axis direction of the liquid crystal molecules or the strength of the birefringence in a non-voltage-applying state and in a voltage-applying state. Consequently, by use of the liquid crystal molecules as a black and white shutter, a bright state and a dark state can be produced. For example, in a non-voltage-applying state, the setting of the polarizing axis of the polarizing plate 6a to be consistent with the alignment direction of the liquid crystal molecules (the alignment treatment direction of the first alignment layer 3a) causes the direction of polarized light transmitted through the polarizing plate 6a not to be rotated at 90°. As a result, the polarized light is intercepted by the polarizing plate 6b so that a dark state is generated. On the other hand, in a voltage-applying state, the alignment direction of the liquid crystal molecules come to have an angle θ

(desirably, θ=45°) to the polarizing axes of the polarizing plates 6a and 6b. Thus, the direction of polarized light is rotated by action of the liquid crystal molecules so that the light transmitted through the polarizing plate 6b. As a result, a bright state is generated. As described above, in the liquid crystal display of the invention, a ferroelectric liquid crystal is used as a black and white shutter; therefore, the liquid crystal display has an advantage that the response speed can be made fast. The liquid crystal display can attain gray scale display by controlling the transmitted light amount thereof in accordance with the voltage applied thereto.

As described above, in the liquid crystal display in which the polarizing plates are set up, a dark state is generated in a non-voltage-applying state and in the state when a minus voltage is applied to the second electrode layer; while a bright state is generated in the state when a positive voltage is applied to the second electrode layer. Accordingly, when the liquid crystal display is displayed by a field sequential color system, the generation of a bright state can be avoided, for example, by scanning in synchronization with a back light R (red) when a back light G (green) lights on, as illustrated in FIG. 6.

Figure 6:
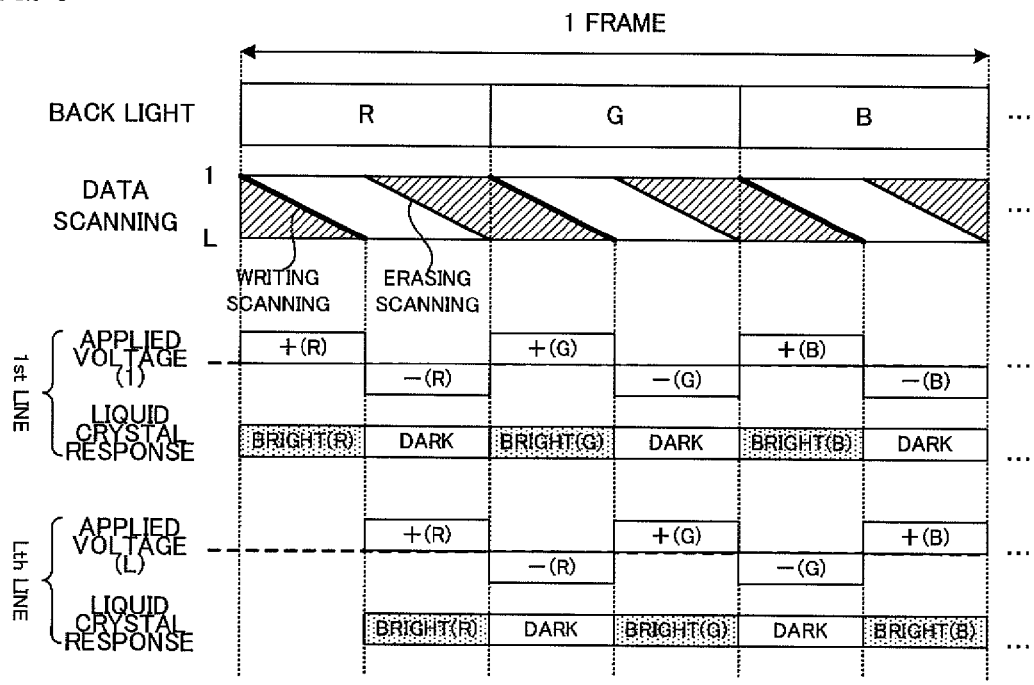
FIG. 6 is a conceptual diagram illustrating a driving sequence of a liquid crystal display based on a field sequential color system.
Figure 13:
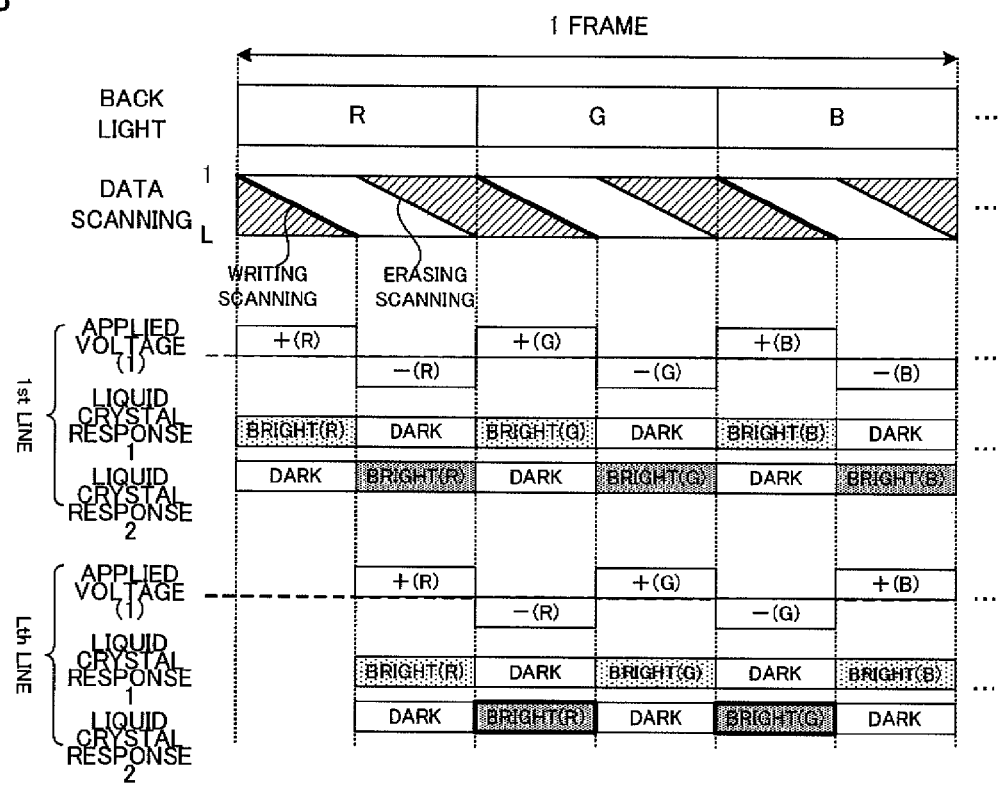
FIG. 13 is a conceptual diagram illustrating a driving sequence of a liquid crystal display based on a field sequential color system.

Symbols and so on in FIG. 6 are the same as described in FIG. 13.

The liquid crystal display of the invention can be driven by an active matrix system using thin film transistors (TFTs). In this case, it is preferred that the first alignment treatment substrate is a TFT substrate having TFTs formed on the first substrate and the second alignment treatment substrate is a common electrode substrate, in which the second electrode layer is a common electrode. FIG. 7 is a schematic perspective view illustrating an example of a liquid crystal display based on an active matrix system using TFTs.

The liquid crystal display 20 illustrated in FIG. 7 has: a TFT substrate (first alignment treatment substrate) 21, in which TFT elements 25 are provided in a matrix form on a first substrate 1a, and a common electrode substrate (second alignment treatment substrate) 22, in which a common electrode 23 is formed on a second substrate 1b. In the common electrode substrate (second alignment treatment substrate) 22, a reactive liquid crystal layer 4 is formed on a second alignment layer 3b. In the TFT substrate (first alignment treatment substrate) 21, gate electrodes 24x, source electrodes 24y and pixel electrodes 24t are formed. The gate electrodes 24x and the source electrodes 24y are arranged lengthways and sideways, respectively. When signals are supplied to the gate electrodes 24x and the source electrodes 24y, the TFT elements 25 are operated so that the ferroelectric liquid crystal can be driven. Regions where the gate electrodes 24x and the source electrodes 24y cross each other are insulated with an insulating layer, which is not illustrated. Signals to the gate electrodes 24x can act independently of signals to the source electrodes 24y. Regions surrounded by the gate electrodes 24x and the source electrodes 24y are each a pixel, which is a minimum unit for driving the liquid crystal display of the invention. In each of the pixels, one or more TFT elements 25 and one or more pixel electrodes 24t are formed. By applying signal voltages successively to the gate electrodes and the source electrodes, the TFT elements in the individual pixels can be operated. In FIG. 7, a liquid crystal layer and a first alignment layer are omitted.

When the gate electrodes are made into a high voltage, for example, about 30 V in the liquid crystal display, the switches of the TFT elements turn on so that a signal voltage is applied to the ferroelectric liquid crystal through the source electrodes. When the gate electrodes are made into a low voltage, for example, about −10 V, the switches of the TFT elements turn off. As illustrated in FIG. 8, in the state of switching-off, a voltage is applied to between the common electrode 23 and the gate electrodes 24x so as to make the side of the common electrode 23 positive. In this switching-off state, the ferroelectric liquid crystal does not act, so that the corresponding pixels turn into a dark state.

As described above, in the invention, the spontaneous polarization of the liquid crystal molecules is directed to the side of the first alignment treatment substrate by polar surface interaction in a non-voltage-applying state. Specifically, as illustrated in FIG. 8, in the state of switching-off, the spontaneous polarization Ps of the liquid crystal molecules 8 is directed to the side of the TFT substrate (first alignment treatment substrate) 21. Accordingly, the direction of the spontaneous polarization is not affected by the voltage applied to between the common electrode 23 and the gate electrodes 24x.

On the other hand, for example, when the spontaneous polarization is directed to the common electrode substrate (second alignment treatment substrate) side in a non-voltage-applying state, the direction of the spontaneous polarization is reversed, near the regions where the gate electrodes are formed, by the effect of the voltage applied to between the common electrode and the gate electrodes in the state of switching-off. As a result, near the regions where the gate electrodes are formed, the ferroelectric liquid crystal operates in spite of the switching-off state, so that light leaks.

Against this, in the present invention, the direction of the spontaneous polarization is not affected by the voltage applied to between the common electrode and the gate electrodes, as described above. As a result, light does not leak. In the invention, therefore, light leakage near the regions of the gate electrodes can be prevented by controlling the direction of the spontaneous polarization and rendering the second alignment treatment substrate, in which the reactive liquid crystal layer is formed, a common electrode substrate.

Each of the constituent members of the liquid crystal display of the invention will be described in detail.

1. Liquid Crystal Layer

The liquid crystal layer used in the present invention is constructed by holding a ferroelectric liquid crystal between a reactive liquid crystal layer and a first alignment layer. The ferroelectric liquid crystal used in the invention is not particularly limited as long as the liquid crystal is a liquid crystal exhibiting mono-stability and further having a molecular direction which is changed by about 2 times the tilt angle of the ferroelectric liquid crystal in the parallel to the first alignment treatment substrate surface when a negative voltage is applied to the second electrode layer.

The wording "the molecular direction of the ferroelectric liquid crystal is changed by about 2 times the tilt angle θ of the ferroelectric liquid crystal to the first alignment treatment substrate surface when a negative voltage is applied to the second electrode layer" means the following: each of the liquid crystal molecules is stabilized into a single state on the cone when no voltage is applied thereto; when a negative voltage is applied to the second electrode layer, the liquid crystal molecule is inclined to one side on the cone from the mono-stability state; when a positive voltage is applied to the second electrode layer, the liquid crystal molecule is kept in the mono-stability state or is inclined from the mono-stability state to the side reverse to the side when a negative voltage is applied to the second electrode layer; and the inclination angle of the liquid crystal molecule from the mono-stability state when a negative voltage is applied to the second electrode layer is larger than the inclination angle of the liquid crystal molecule from the mono-stability state when a positive voltage is applied to the second electrode layer.

FIGS. 9A to 9C are each a schematic view illustrating an example of the alignment state of a ferroelectric liquid crystal exhibiting mono-stability. FIGS. 9A, 9B and 9C illustrate a case where no voltage is applied thereto, a case where a negative voltage is applied to the second electrode layer, and a case where a positive voltage is applied to the second electrode layer, respectively. In the non-voltage-applied case, each liquid crystal molecule 8 is stabilized into a single state on the cone (FIG. 9A). In the case where a negative voltage is applied to the second electrode layer, the liquid crystal molecule 8 is inclined from the stabilized state (broken line) to one side (FIG. 9B). In the case where a positive voltage is applied to the second electrode layer, the liquid crystal molecule 8 is inclined from the stabilized state (broken line) to the side reverse to the side when a negative voltage is applied to the second electrode layer (FIG. 9C). In this case, the inclination angle δ when the negative voltage is applied to the second electrode layer is larger than the inclination angle ω when the positive voltage is applied to the second electrode layer. In FIGS. 9A to 9C, d represents the direction of alignment treatment, and z represents a layer normal line.

When a negative voltage is applied to the second electrode layer, each of the liquid crystal molecules is inclined from the mono-stability state to one side on the cone at an angle corresponding to the applied voltage. As illustrated in FIG. 9A, in the ferroelectric liquid crystal, a position A (the direction of the liquid crystal molecule 8), a position B (the alignment treatment direction d), and a position C are not necessarily consistent with each other. As illustrated in FIG. 9B, therefore, the maximum inclination angle δ when a negative voltage is applied to the second electrode layer is about 2 times the tilt angle θ (angle 2θ).

As illustrated in, for example, FIG. 4, the direction of the liquid crystal molecules 8 is changed by about 2 times the tilt angle θ (angle 2θ) parallel to the first alignment treatment substrate surface. The wording "being changed by about 2 times the tilt angle θ" means a case of being changed by an angle of 2θ±5°.

The above-mentioned angle is a value obtained by a measurement made as follows: first, a polarizing microscope in which polarizing plates are provided under a Crossed Nicol condition and a liquid crystal display are positioned to make the polarizing axis of one of the polarizing plates parallel to the alignment direction of liquid crystal molecules of its liquid crystal layer. This position is used as a standard. When a voltage is applied thereto, the liquid crystal molecules come to have a predetermined angle to the polarizing axis; thus, polarized light penetrating through the polarizing plate transmitted through the other polarizing plate so that a bright state is generated. In this voltage-applying state, the liquid crystal display is rotated so as to be turned into a dark state. The angle at which the liquid crystal display is rotated at this time is measured. The angle at which the liquid crystal display is rotated is the angle at which the molecular direction of the ferroelectric liquid crystal is changed.

As described above, when a negative voltage is applied to the second electrode layer, each of the liquid crystal molecules is inclined from the mono-stability state thereof to one side on the cone at an angle corresponding to the applied voltage. Thus, in the case that the liquid crystal display is actually driven, it cannot be said that the direction of the liquid crystal molecule is changed by about 2 times the tilt angle when a negative voltage is applied to the second electrode layer.

Figure 10A:
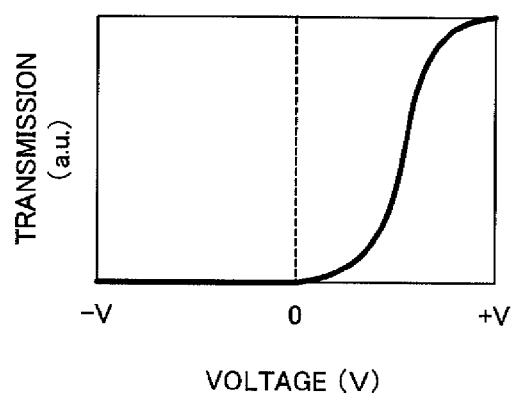
FIGS. 10A and 10B are each a graph showing changes in transmission to a voltage applied to ferroelectric liquid crystals.
Figure 10B:
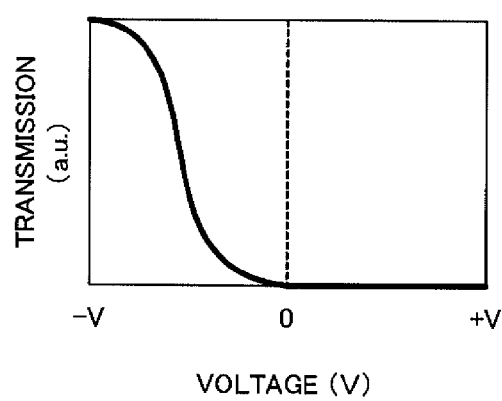

As such a ferroelectric liquid crystal, specifically, the following is used: a ferroelectric liquid crystal having a half-V shaped switching (referred to as "HV-shaped switching" hereinafter) characteristics, in which the liquid crystal molecules operate only when either one of positive and negative voltages, as illustrated in FIGS. 10A and 10B, is applied thereto. Since a ferroelectric liquid crystal showing the HV-shaped switching is used, the opening time as a black and white shutter can be provided for a sufficiently long time. Thereby, each color to be switched by time can be displayed further brightly so that a bright color liquid crystal display can be realized.

The "HV-shaped switching characteristics" in the invention mean electrooptic characteristics of exhibiting an asymmetric light transmission in response to applied voltage.

The phase sequence of the ferroelectric liquid crystal is not particularly limited as long as a chiral smectic phase (SmC*) is expressed. Examples thereof include a phase sequence where a phase change of nematic phase (N)-cholesteric phase (Ch)-chiral smectic C phase (SmC*) advances; a phase sequence where a phase change of nematic phase (N)-chiral smectic C phase (SmC*) advances; a phase sequence where a phase change of nematic phase (N)-smectic A phase (SmA)-chiral smectic C phase (SmC*) advances; and a phase sequence where a phase change of nematic phase (N)-cholesteric phase (CH)-smectic A phase (SmA)-chiral smectic C phase (SmC*) advances.

Figure 11:
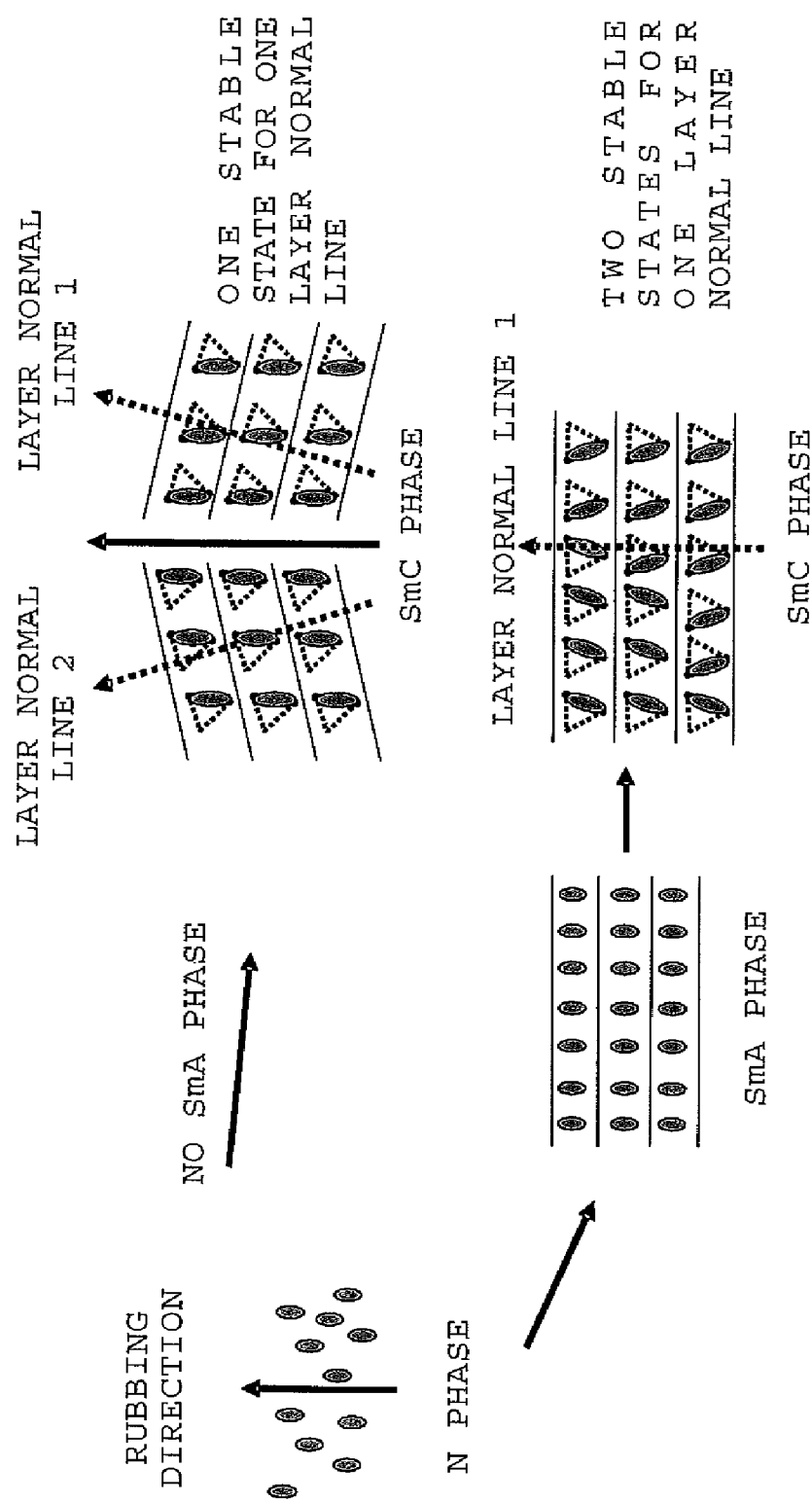
FIG. 11 is a view illustrating a difference of alignment based on a difference of the phase sequence that ferroelectric liquid crystal has.
Figure 12:
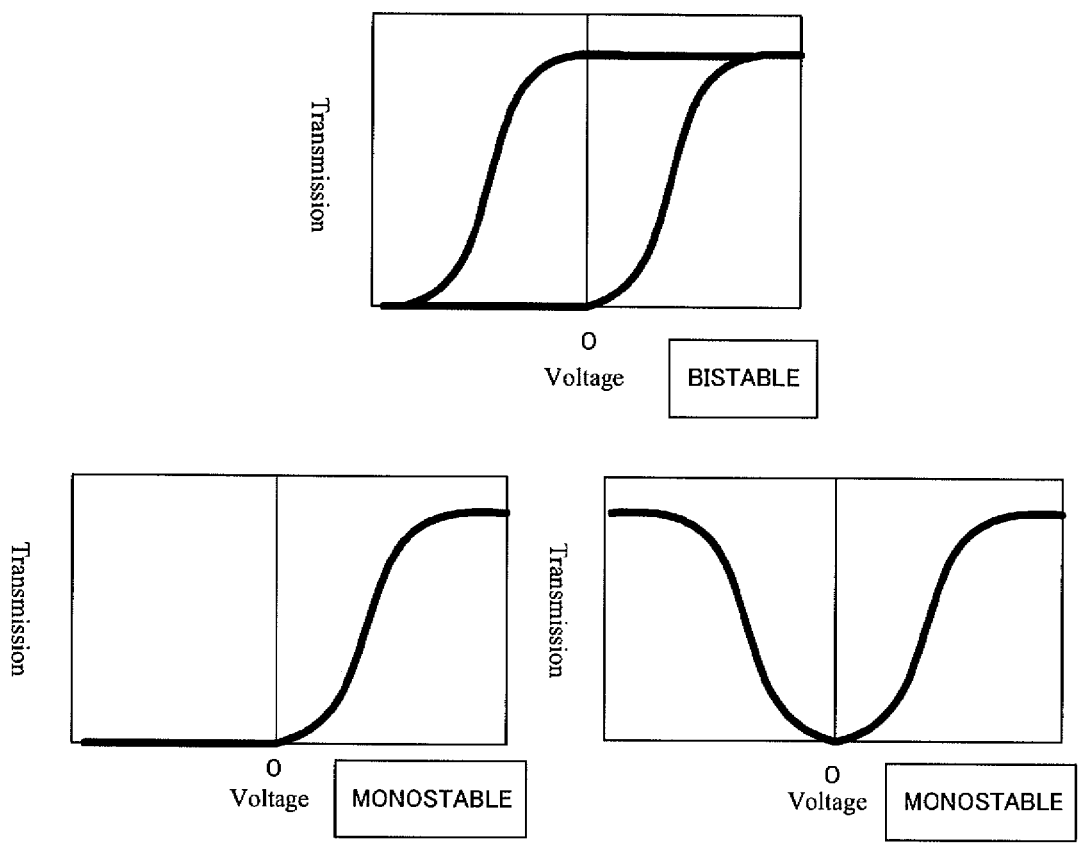
FIG. 12 is a graph showing changes in transmission to a voltage applied to ferroelectric liquid crystals.

In general, the ferroelectric liquid crystal having the phase sequence passing through SmA phase as exemplified in the lower part of FIG. 11 has the layer interval of the smectic layer shorten in the phase change process so as to have a chevron structure with the smectic layer bent for compensating the volume change. According to the bent direction, a domain having a different longer axis direction of the liquid crystal molecule is formed so as to easily generate the alignment defect called the zigzag defect or the hairpin defect in the boundary surface, and thus it is problematic. Generally, in a ferroelectric liquid crystal having a phase sequence which exists by way of no SmA phase as illustrated in the upper part of FIG. 11, two domains (double domains) in which their layer normal lines are different from each other are easily generated. In the invention, the alignment of a ferroelectric liquid crystal can be made into a mono-stability state without generating such alignment defects.

Such a ferroelectric liquid crystal can be variously selected from generally-known liquid crystal materials in accordance with required properties.

The liquid crystal material which expresses a SmC* phase from a Ch phase by way of no SmA phase is particularly suitable as a material exhibiting HV-shaped switching characteristics. A specific example thereof is "R2301" manufactured by AZ Electronic Materials.

The liquid crystal material which exists by way of a SmA phase is preferably a liquid crystal material which expresses a SmC* phase from a Ch phase by way of a SmA phase since the material can be selected from wide range. In this case, as such a ferroelectric liquid crystal, although a single material expressing the SmC* phase can be used, a material expressing the above-mentioned phase sequence by adding a small amount of a optically active substance not expressing the SmC phase itself but capable of inducing the spontaneous polarization and an appropriate spiral pitch to a low viscosity non-chiral liquid crystal easily expressing the SmC phase (hereinafter, it may be referred to as the host liquid crystal) is preferable. This is because it has low viscosity and capable of realizing a faster response.

As the host liquid crystal mentioned above, a material expressing the SmC phase in a wide temperature range is preferable. Those commonly known as a host liquid crystal for a ferroelectric liquid crystal can be used without limitation particularly. For example, a compound represented by the below-mentioned general formula:

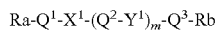

(in the formula, Ra and Rb are each a straight chain or branched alkyl group, an alkoxy group, an alkoxy carbonyl group, an alkanoyloxy group or an alkoxy carbonyloxy group; $Q^1$, $Q^2$ and $Q^3$ are each a 1,4-phenylene group, a 1,4-cyclohexylene group, a pyridine-2,5-diyl group, a pyradine-2,5-diyl group, a pyridazine-3,6-diyl group or a 1,3-dioxane-2,5-diyl group, in which these groups may have a substituent group such as a halogen atom, a hydroxyl group and a cyano group; $X^1$ and $Y^1$ are each —COO—, —OCO—, —CH$_2$O—, —OCH$_2$—, —CH$_2$CH$_2$—, —C≡C— or a single bond; and m is 0 or 1) can be used. As the host liquid crystal, the above-mentioned compounds can be used either alone by one kind or as a combination of two or more kinds.

The optically active substance to be added to the above-mentioned host liquid crystal is not particularly limited as long as it is a material having the large spontaneous polarization and the ability capable of inducing an appropriate spiral pitch. Those commonly known as a material to be added to a liquid crystal composition expressing the SmC phase can be used. In particular, a material capable of inducing the large spontaneous polarization by a small addition amount is preferable. As such an optically active substance, for example, a compound represented by the below-mentioned general formula:

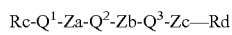

(in the formula, each $Q^1$, $Q^2$, $Q^3$ denote the same things as in the above-mentioned general formula; Za and Zb are each —COO—, —OCO—, —CH$_2$O—, —OCH$_2$—, —CH$_2$CH$_2$—, —C≡C—, —CH=N—, —N=N—, —N(→O)=N—, —C(=O)S— or a single bond; Rc is a straight chain or branched alkyl group, which may have an asymmetric carbon atom, an alkoxy group, an alkoxy carbonyl group, an alkanoyloxy group or an alkoxy carbonyloxy group; Rd is a straight chain or branched alkyl group having an asymmetric carbon atom, an alkoxy group, an alkoxy carbonyl group, an alkanoyloxy group or an alkoxy carbonyloxy group, and Rc and Rd each may be substituted with a halogen atom, a cyano group or a hydroxyl group) can be used. As the optically active substance, the above-mentioned compounds can be used either alone by one kind or as a combination of two or more kinds.

As the ferroelectric liquid crystal by way of the SmA phase, specifically, "FELIXM4851-100" commercially available from AZ Electronic Materials, or the like can be presented.

In the liquid crystal display using a ferroelectric liquid crystal exhibiting mono-stability, the transmission thereof depends on the inclination angle of the liquid crystal molecules when a voltage is applied thereto. When either one of positive and negative voltages is applied thereto, each of the liquid crystal molecules is inclined on the cone. As illustrated in, for example, FIGS. 10A and 10B, therefore, the inclination angle of the liquid crystal molecules is changed in accordance with the applied voltage, so that the transmission is changed. In this case, the transmission becomes maximum when the inclination angle of the liquid crystal molecules is 45° from the mono-stability state.

Accordingly, in order to realize a high transmission, it is preferred to use a ferroelectric liquid crystal in which the inclination angle of liquid crystal molecules becomes 45° from the mono-stability state in the case that a negative voltage is applied to the second electrode layer when the liquid crystal display is actually driven.

In the case of using, for example, a ferroelectric liquid crystal in which the maximum inclination angle δ of liquid crystal molecules from the mono-stability state thereof is larger than 45° as illustrated in FIGS. 9A to 9C, the inclination angle of the liquid crystal molecules from the mono-stability state can be set to 45° when a negative voltage is applied to the second electrode layer during actual driving of the liquid crystal display for the following reason: as described above, it cannot be said that when a negative voltage is applied to the second electrode layer during actual the driving, the direction of the liquid crystal molecules is changed by about 2 times the tilt angle.

In the invention, the ferroelectric liquid crystal exhibits mono-stability; thus, the liquid crystal can be driven by an active matrix system using thin film transistors (TFTs). Furthermore, gray scale control can be attained by voltage modulation. This manner makes it possible to realize highly precise and high-quality display.

The thickness of the liquid crystal layer made of the ferroelectric liquid crystal is preferably from 1.2 μm to 3.0 μm, more preferably from 1.3 μm to 2.5 μm, even more preferably from 1.4 μm to 2.0 μm. If the thickness of the liquid crystal layer is too small, the contrast may lower. Conversely, if the thickness is too large, the liquid crystal may not be aligned with ease.

As the method for forming such liquid crystal layer, a method which is generally used as a method for forming a liquid crystal cell can be used. For example, the liquid crystal layer can be formed, by making use of capillary effect to inject an isotropic liquid obtained by heating the above-mentioned ferroelectric liquid crystal into a liquid crystal cell, which is formed by forming the first alignment treatment substrate and the second alignment treatment substrate beforehand, and then sealing the cell with an adhesive agent. The thickness of the liquid crystal layer can be adjusted with spacers such as beads.

2. Second Alignment Treatment Substrate

Next, the second alignment treatment substrate used in the present invention is described. The second alignment treatment substrate in the invention is an alignment treatment substrate having a second substrate, a second electrode layer formed on the second substrate, a second alignment layer formed on the second electrode layer, and a reactive liquid crystal layer formed on the second alignment layer. Each of the constituents of the second alignment treatment substrate will be described hereinafter.

(1) Reactive Liquid Crystal Layer

The Reactive liquid crystal layer used in the present invention is formed on the second alignment layer and formed by fixing the reactive liquid crystal. The reactive liquid crystal is aligned by the second alignment layer, and for example, the reactive liquid crystal layer can be formed by polymerizing the reactive liquid crystal by the ultraviolet ray irradiation, and fixing the aligned state. Since the reactive liquid crystal layer is provided by fixing the aligned state of the reactive liquid crystal, it functions as an alignment layer to align the ferroelectric liquid crystals. Further since the reactive liquid crystal is fixed, it has an advantage of not being adversely affected by factors such as temperature. Still furthermore, since the reactive liquid crystal has a structure relatively similar to that of the ferroelectric liquid crystal, the interaction with the ferroelectric liquid crystal is reinforced so that the ferroelectric liquid crystal alignment can be controlled more effectively than the case of using only the alignment film.

As reactive liquid crystal used in the invention, it is preferable that the reactive liquid crystal expresses a nematic phase. This is because the nematic phase can allow the alignment control relatively easily among the liquid crystal phases.

It is further preferable that the reactive liquid crystal has a polymerizable liquid crystal material. Accordingly, the aligned state of the reactive liquid crystal can be fixed. As the polymerizable liquid crystal material, any of a polymerizable liquid crystal monomer, a polymerizable liquid crystal oligomer and a polymerizable liquid crystal polymer can be used. In the present invention, the polymerizable liquid crystal monomer can be used preferably. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

The above-mentioned polymerizable liquid crystal monomer is not particularly limited as long as it is a liquid crystal monomer having a polymerizable functional group. For example, a monoacrylate monomer, a diacrylate monomer, or the like can be presented. Moreover, these polymerizable liquid crystal monomers may be used alone or as a mixture of two or more kinds.

As the monoacrylate monomer, for example, the compounds represented by the below-mentioned formula can be presented:

[Chemical Formula 3]

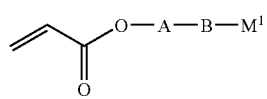

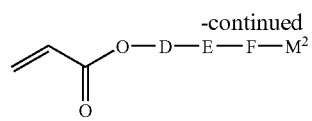

-continued

In the above-mentioned formula, A, B, D, E and F are benzene, cyclohexane or pyrimidine, which may have a substituent group such as halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a spacer such as an alkylene group having 3 to 6 carbon atoms.

Furthermore, as the diacrylate monomer, for example, the compounds represented by the below-mentioned formula can also be presented:

[Chemical Formula 4]

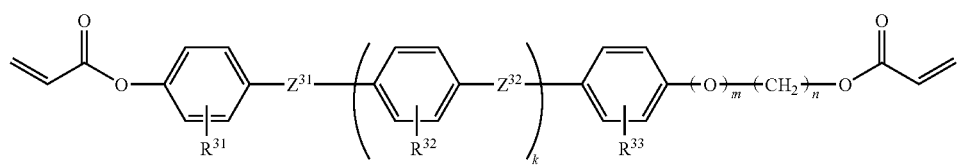

(1)

In the formula (1), $Z^{31}$ and $Z^{32}$ are each independently and directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; $R^{31}$, $R^{32}$ and $R^{33}$ are each independently a hydrogen or an alkyl having 1 to 5 carbon atoms; k and m is each 0 or 1; and n is an integer in a range of 2 to 8. When K=1, $R^{31}$, $R^{32}$ and $R^{33}$ are each independently alkyl having 1 to 5 carbon atoms. When K=0, they are each independently hydrogen or alkyl having 1 to 5 carbon atoms. Further, $R^{31}$, $R^{32}$ and $R^{33}$ may be the same to each other.

As a specific example of the formula (1), a compound represented by the below formula can be cited.

[Chemical Formula 5]

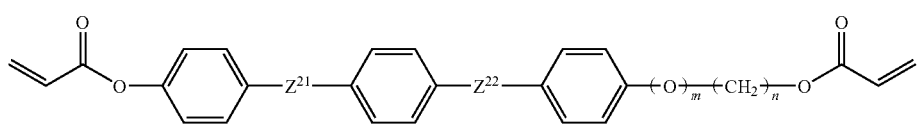

In the above-mentioned formula, $Z^{21}$ and $Z^{22}$ are each independently and directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; m is 0 or 1; and n is an integer in a range of 2 to 8.

Moreover, as the diacrylate monomer, for example, the compounds represented by the below-mentioned formulae (2) and (3) can be presented:

[Chemical Formula 6]

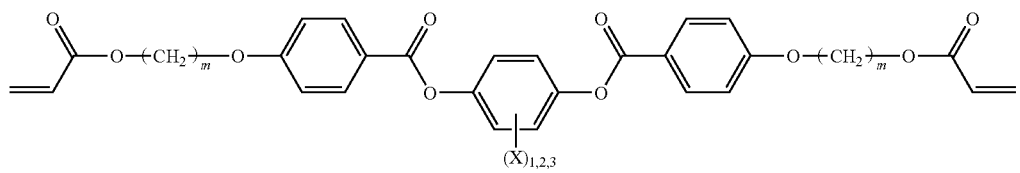

(2)

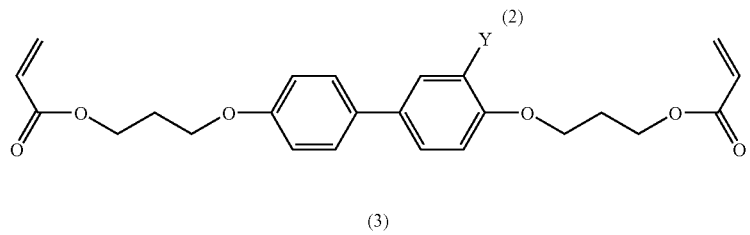

(3)

In the formulae (2) and (3), X and Y each is hydrogen, alkyl having 1 to 20 carbon atoms, alkenyl having 1 to 20 carbon atoms, alkyloxy having 1 to 20 carbon atoms, alkyloxy carbonyl having 1 to 20 carbon atoms, formyl, alkyl carbonyl having 1 to 20 carbon atoms, alkyl carbonyloxy having 1 to 20 carbon atoms, halogen, cyano or nitro; and m is an integer in a range of 2 to 20. Moreover, in the formula (2), X is preferably alkyloxy carbonyl having 1 to 20 carbon atoms, methyl or chlorine. Among them, it is preferably alkyloxy carbonyl having 1 to 20 carbon atoms, and particularly preferably $CH_3(CH_2)_4OCO$.

In the present invention, the compounds represented by the formulae (1) and (2) are preferably used, and the compound represented by the formula (1) is particularly suitable. As the specific examples, ADEKA CHIRACOL PLC-7183 and ADEKA CHIRACOL PCL-7209 manufactured by ASAHI DENKA Co., Ltd., or the like can be presented.

The polymerizable liquid crystal monomer used in the invention is preferably a diacrylate monomer among the above-mentioned examples. This is because the diacrylate monomer can carry out polymerization easily while preferably maintaining the aligned state.

The above-mentioned polymerizable liquid crystal monomer may not express the nematic phase by itself. These polymerizable liquid crystal monomers may be used as a mixture of two or more kinds as mentioned above so that a composition mixture thereof, that is, a reactive liquid crystal may express the nematic phase.

Furthermore, in the present invention, as needed, a photo polymerization initiating agent or a polymerization inhibiting agent may be added to the above-mentioned reactive liquid crystal. For example, at the time of polymerizing a polymerizable liquid crystal material by the electron beam irradiation, the photo polymerization initiating agent may not be needed, however, in the case of the polymerization used commonly by for example, the ultraviolet ray irradiation, a photo polymerization initiating agent is generally used for promoting the polymerization.

As the photo polymerization initiating agent to be used in the present invention, benzyl (it is also referred to as bibenzoyl), benzoin isobutyl ether, benzoin isopropyl ether, benzophenone, benzoyl benzoic acid, methyl benzoyl benzoate, 4-benzoyl-4'-methyl diphenyl sulfide, benzyl methyl ketal, dimethyl amino methyl benzoate, 2-n-butoxy ethyl-4-dimethyl amino benzoate, p-dimethyl amino isoamyl benzoate, 3,3'-dimethyl-4-methoxybenzophenone, methylbenzoyl formate, 2-methyl-1-(4-(methyl thio)phenyl)-2-morpholino propane-1-on, 2-benzyl-2-dimethyl amino-1-(4-morpholino phenyl)-butane-1-on, 1-(4-dodecyl phenyl)-2-hydroxy-2-methyl propane-1-on, 1-hydroxy cyclohexyl phenyl ketone, 2-hydroxy-2-methyl-1-phenyl propane-1-on, 1-(4-isopropyl phenyl)-2-hydroxy-2-methyl propane-1-on, 2-chloro thioxantone, 2,4-diethyl thioxantone, 2,4-diisopropyl thioxantone, 2,4-dimethyl thioxantone, isopropyl thioxantone, 1-chloro-4-propoxy thioxantone, or the like can be presented. In addition to the photo polymerization initiating agent, a sensitizing agent may be added within a range of not deteriorating the object of the present invention.

The addition amount of such a photo polymerization initiating agent is in general 0.01 to 20% by weight, it is preferably 0.1 to 10% by weight, and more preferably in a range of 0.5 to 5% by weight so as to be added to the above-mentioned reactive liquid crystal.

The thickness of the reactive liquid crystal layer used in the present invention may be determined based on the needed anisotropy. For example, the thickness of the reactive liquid crystal layer can be set in a range of 1 nm to 1,000 nm, and it is more preferably in a range of 3 nm to 100 nm. In the case the reactive liquid crystal layer is thicker than the above-mentioned range, the anisotropy is generated excessively, and in the case it is thinner than the above-mentioned range, the predetermined anisotropy may not be obtained.

Next, the method for forming the reactive liquid crystal layer will be explained. The reactive liquid crystal layer can be formed by coating a reactive liquid crystal layer coating solution including the above-mentioned reactive liquid crystal onto the second alignment layer and applying the alignment treatment so as to fix the aligned state of the above-mentioned reactive liquid crystal.

Moreover, a method of preliminarily forming a dry film, or the like and laminating the same onto the second alignment layer can also be used instead of coating the reactive liquid crystal layer coating solution. It is preferable to use the method of preparing a reactive liquid crystal coating solution by dissolving a reactive liquid crystal in a solvent, coating the same on the second alignment layer and removing the solvent because of the simplicity in the manufacturing process.

The solvent used for the above-mentioned reactive liquid crystal layer coating solution is not particularly limited as long as it can dissolve the above-mentioned reactive liquid crystal, or the like without inhibiting the alignment ability of the second alignment layer. For example, one kind or tow or more kinds of hydrocarbons such as benzene, toluene, xylene, n-butyl benzene, diethyl benzene and tetralin; ethers such as methoxy benzene, 1,2-dimethoxy benzene and diethylene glycol dimethyl ether; ketones such as acetone, methyl ethyl ketone, methyl isobutyl ketone, cyclohexanone and 2,4-pentane dion; esters such as ethyl acetate, propylene glycol monomethyl ether acetate, propylene glycol monoethyl ether acetate and γ-butyrolactone; amide based solvents such as 2-pyrolidone, N-methyl-2-pyrolidone, dimethyl formamide and dimethyl acetamide; alcohols such as t-butyl alcohol, diacetone alcohol, glycerol, monoacetin, ethylene glycol, triethylene glycol and hexylene glycol; phenols such as phenol and parachloro phenol; cellosolves such as methyl cellosolve, ethyl cellosolve, butyl cellosolve and ethylene glycol monomethyl ether acetate can be used.

Moreover, by using only one kind of a solvent, the solubility of the above-mentioned reactive liquid crystal, or the like may be insufficient or the second alignment layer may be corroded as mentioned above. By using two or more kinds of the solvents as a mixture, the trouble can be avoided. Among the above-mentioned solvents, those preferable as a single solvent are the hydrocarbons and the glycol monoether acetate based solvents, and those preferable as a solvent mixture are a mixture of the ethers or the ketones and the glycol based solvents.

Since the concentration of the reactive liquid crystal layer coating solution depends on the solubility of the reactive liquid crystal and the thickness of the reactive liquid crystal layer to be formed, it cannot be defined on the whole, however, it is prepared in general in a range of 0.1 to 40% by weight, and preferably in a range of 1 to 20% by weight. In the case the concentration of the reactive liquid crystal layer coating solution is lower than the above-mentioned range, the reactive liquid crystals may hardly be aligned. On the other hand, in the case the concentration of the reactive liquid crystal layer coating solution is higher than the above-mentioned range, the viscosity of the reactive liquid crystal layer coating solution becomes higher so that an even coating film may hardly be formed.

Furthermore, to the above-mentioned reactive liquid crystal layer coating solution, the compounds as mentioned below can be added within a range of not deteriorating the purpose of the present invention. As the compounds to be added, for example, polyester (meth)acrylates obtained by reacting a polyester prepolymer obtained by the condensation of a polyhydric alcohol and a monobasic acid or a polybasic acid with (meth) acrylic acid; polyurethane (meth)acrylates obtained by reacting a polyol group and a compound having two isocyanate groups with each other, and reacting the reaction product with (meth) acrylic acid; photo polymerizable compounds such as epoxy (meth)acrylate, obtained by reacting epoxy resins such as a bisphenol A type epoxy resin, a bisphenol F type epoxy resin, a novolak type epoxy resin, polycarboxylic acid polyglycidyl ester, polyol polyglycidyl ether, an aliphatic or alicyclic epoxy resin, an amine epoxy resin, a triphenol methane type epoxy resin and a dihydroxy benzene type epoxy resin with (meth) acrylic acid; photo polymerizable liquid crystal compounds having an acrylic group or a methacrylic group, or the like can be presented.

The addition amount of these compounds to the above-mentioned reactive liquid crystal can be selected within a range of not deteriorating the purpose of the present invention. By adding these compounds, the hardening properties of the reactive liquid crystal can be improved so that the mechanical strength of the reactive liquid crystal layer to be obtained can be increased and furthermore, the stability thereof can be improved.

AS a method for coating such a reactive liquid crystal layer coating solution, a spin coating method, a roll coating method, a printing method, a dip coating method, a die coating method, a casting method, a bar coating method, a blade coating method, a spray coating method, a gravure coating method, a reverse coating method, a extruding coating method, or the like can be presented.

Moreover, after coating the above-mentioned reactive liquid crystal layer coating solution, the solvent is removed, and the solvent removal can be carried out by the reduced pressure removal or the heating removal; furthermore, a method as a combination thereof, or the like.

According to the present invention, as mentioned above, the coated reactive liquid crystal is aligned by the second alignment layer so as to be in a state having the liquid crystal regularity. That is, the reactive liquid crystal comes to have the nematic phase. This is carried out in general by a method of the heat treatment to the N-I transition point or lower, or the like. Here, the "N-I transition point" denotes the temperature of the transition from the liquid crystal phase to the isotropic phase.

As mentioned above, the reactive liquid crystal has a polymerizable liquid crystal material. In order to fix the aligned state of such a polymerizable liquid crystal material, a method of directing an activating radiation for activating the polymerization is used. The "activating radiation" here is the radiation having the ability of inducing the polymerization to the polymerizable liquid crystal material. As needed, a photo polymerization initiating agent may be included in the polymerizable liquid crystal material.

The activating radiation is not particularly limited as long as it is a radiation capable of polymerizing the polymerizable liquid crystal material. In general, from the viewpoint of the device easiness, or the like, an ultraviolet ray or a visible light beam is used. An irradiation beam having a wavelength of 150 to 500 nm, preferably 250 to 450 nm, further preferably 300 to 400 nm is used.

According to the present invention, a method of directing an ultraviolet ray as the activating radiation to a polymerizable liquid crystal material to have the radical polymerization by generating a radical by the photo polymerization initiating agent with an ultraviolet ray is a preferable method. Since the method of using an ultraviolet ray as the activating radiation is a technique already established, it can be applied easily to the present invention including the photo polymerization initiating agent to be used.

As the light source of the irradiating light beam, a low pressure mercury lamp (a germicidal lamp, a fluorescent chemical lamp, a black light), a high pressure discharge lamp (a high pressure mercury lamp, a metal halide lamp), a short arc discharge lamp (an ultra high pressure mercury lamp, a xenon lamp, a mercury xenon lamp), or the like can be presented as the examples. In particular, use of a metal halide lamp, a xenon lamp, a high pressure mercury lamp, or the like can be recommended. Moreover, the irradiation strength is adjusted optionally according to the composition of the reactive liquid crystal and the amount of the photo polymerization initiating agent.

The irradiation of such an activating radiation can be carried out by the temperature condition to have the above-mentioned polymerizable liquid crystal material in a liquid crystal phase, or at a temperature lower than the temperature to have the liquid crystal phase. The polymerizable liquid crystal material once had the liquid crystal phase would not have the sudden disturbance of the aligned state even in the case the temperature is lowered thereafter.

As a method for fixing the aligned state of the polymerizable liquid crystal material, in addition to the above-mentioned method of directing the activating radiation, a method of polymerizing the polymerizable liquid crystal material by heating can be used as well. As the reactive liquid crystal used in this case, those having the polymerizable liquid crystal monomers contained in the reactive liquid crystal are thermally polymerized at the N-I transition point or lower of the reactive liquid crystal are preferable.

(2) Second Alignment Layer

The second alignment layer used in the present invention is not particularly limited as long as it can align the ferroelectric liquid crystal and does not affect the fixation of the aligned state. As such a second alignment layer, for example, those having the rubbing process, the photo alignment treatment, or the like applied can be used. In the present invention, it is preferable to use a photo alignment layer with the photo alignment treatment applied. Since the photo alignment treatment is a non contact alignment treatment, it is effective in that the quantitative alignment treatment can be controlled without generation of the static electricity or the dusts. Hereinafter, such a photo alignment layer will be explained.

(i) Photo Alignment Layer

The photo alignment layer has the liquid crystal molecules on the layer aligned by providing the anisotropy to a layer obtained by directing a light beam with the polarization controlled to a substrate coated with the constituent materials of the photo alignment layer to be described later so as to generate the photo-excitation reaction (decomposition, isomerization, dimerization).

The constituent material for the photo alignment layer used in the present invention is not particularly limited as long as it has the effect of aligning the ferroelectric liquid crystal by generating the photo-excitation reaction by directing a light beam (photoaligning). Such materials can be roughly classified into the photoreactive type materials to exhibit the anisotropy to the photo alignment layer by generating the photoreaction and the photo-isomerizable type materials to exhibit the anisotropy to the photo alignment layer by generating the photo-isomerization reaction.

The wavelength range of light which causes photo-excitation reaction in the constituent materials of the photo alignment layers is preferably within the wavelength range of ultraviolet rays, that is, the range of 10 to 400 nm, more preferably within the range of 250 to 380 nm.

Hereinafter, each of the photoreactive type material and the photo-isomerization type material will be explained.

(Photoreaction Type)

First, the photoreaction type constituent materials will be explained. As mentioned above, the photoreaction type constituent material is a material to exhibit the anisotropy to the photo alignment layer by generating the photoreaction. The photoreactive type constituent materials used in the present embodiment are not particularly limited as long as they have such properties. Among them, a material to exhibit the anisotropy to the above-mentioned photo alignment layer by generating the photo-dimerization reaction or the photo-decomposition reaction is preferable.

The photo-dimerization reaction is a reaction that two molecules are polymerized by radical polymerization of their reactive sites aligned in the direction of polarization through the light irradiation. This reaction makes it possible to stabilize the alignment in the polarization direction to give anisotropy to the photo alignment layer. On the other hand, the photo-decomposition reaction is a reaction which decomposes a molecule chain of polyimide or the like which is aligned in the direction of polarization by the light irradiation. This reaction makes it possible to give anisotropy to the photo alignment layer in the state that the molecule chain aligned in the direction perpendicular to the polarization direction remains. It is more preferable in the invention to use, out of these photoreactive materials, materials which give an isotropy to the photo alignment layer by the photo-dimerization reaction since the materials are high in exposure sensitivity and the scope of material-selection is wide.

The photoreactive material using the photo-dimerization reaction is not limited to any especial kind if the material can give anisotropy to the photo alignment layer by photo-dimerization reaction. The material preferably comprises a photo-dimerization-reactive compound having a radically-polymerizable functional group and showing dichroism having different absorptions depending on the polarization direction thereof. This is because the alignment of the photo-dimerization-reactive compound is stabilized and anisotropy can easily be given to the photo alignment layer by radically-polymerizing its reactive sites aligned in the polarization direction.

Examples of the photo-dimerization-reactive compound having such properties include dimerization-reactive polymers each having, as its side chain, at least one reactive site selected from cinnamic acid ester, coumalin, quinoline, a chalcone group and a cinnamoyl group.

Of these, the following is preferred as the photo-dimerization-reactive compound having such properties: a dimerization-reactive polymer having, as its side chain, any one of cinnamic acid ester, coumalin and quinoline. This is because the compound is radically-polymerized in the state that the double bonds in the α,β-unsaturated ketone aligned in the polarization direction function as reactive sites, whereby anisotropy can easily be given to the photo alignment layer.

The main chain of the dimerization-reactive polymer is not limited to any especial kind if the main chain is a chain that is generally known as a polymer main chain, and is preferably a chain which does not have a substituent containing many π electrons, which hinder interactions between the reactive sites of the above-mentioned side chain, an example of the substituent being an aromatic hydrocarbon group.

The weight-average molecular weight of the dimerization-reactive polymer is not especially limited, and is preferably from 5,000 to 40,000, more preferably from 10,000 to 20,000. The weight-average molecular weight can be measured by gel permeation chromatography (GPC). If the weight-average molecular weight of the dimerization-reactive polymer is too small, an appropriate anisotropy may not be given to the photo alignment layer. Conversely, if it is too large, the viscosity of the coating solution at the time of the formation of the photo alignment layer is so high that a homogeneous coat film may not easily be formed.

As the dimerization-reactive polymer, a compound represented by the following formula can be illustrated:

[Chemical Formula 7]

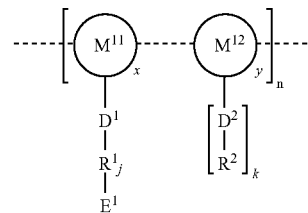

In the formula, $M^{11}$ and $M^{12}$ each independently represent a monomer unit of a homopolymer or a copolymer. Examples thereof include ethylene, acrylate, methacrylate, 2-chloroacrylate, acrylamide, methacrylamide, 2-chloroacrylamide, styrene derivatives, maleic acid derivatives, and siloxane. $M^{12}$ may be acrylonitrile, methacrylonitrile, methacrylate, methyl methacrylate, hydroxyalkyl acrylate or hydroxyalkyl methacrylate; x and y each represent the mole ratio of each of the monomer units when the units are polymerized into a copolymer, and are each a number satisfying: $0<x\leq 1$, $0\leq y<1$, and $x+y=1$; and n represents an integer of 4 to 30,000. $D^1$ and $D^2$ each represent a spacer unit.

$R^1$ is a group represented by -$A^1$-($Z^1$—$B^1$)$_z$—$Z^2$—, and $R^2$ is a group represented by -$A^1$-($Z^1$—$B^1$)$_z$—$Z^3$—, in which $A^1$ and $B^1$ each independently represent a covalent single bond, pyridine-2,5-diyl, pyrimidine-2,5-diyl, 1,4-cyclohexylene, 1,3-dioxane-2,5-diyl, or 1,4-phenylene which may have a substituent; $Z^1$ and $Z^2$ each independently represent a covalent single bond, —CH$_2$—CH$_2$—, —CH$_2$O—, —OCH$_2$—, —CONR—, —RNCO—, —COO— or —OOC—, in which R is a hydrogen atom or a lower alkyl group; $Z^3$ is a hydrogen atom, alkyl or alkoxy which has 1 to 12 carbon atoms and may have a substituent, cyano, nitro or halogen; z is an integer of 0 to 4; $E^1$ represents a photo dimerization-reactive site, examples of which include cinnamic acid ester, coumalin, quinoline, a chalcone group and a cinnamoyl group; and j and k are each independently 0 or 1.

As the dimerization-reactive polymer, include compounds represented by the following formulae can be specifically cited:

[Chemical Formula 8]

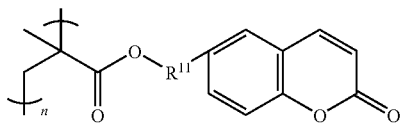

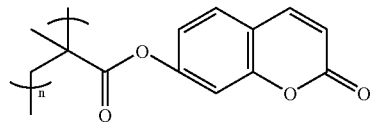

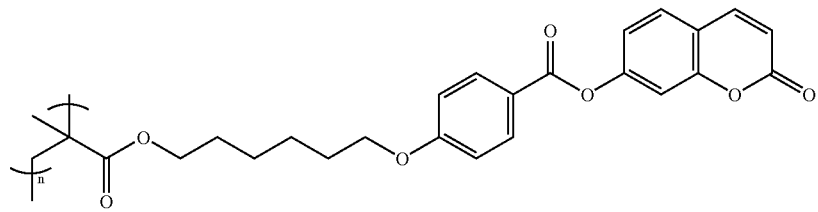

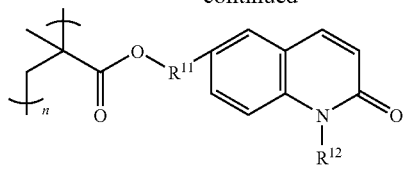

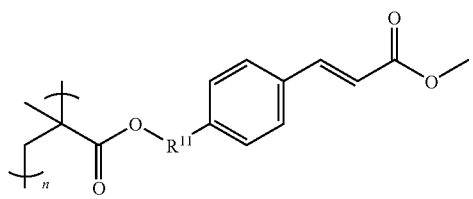

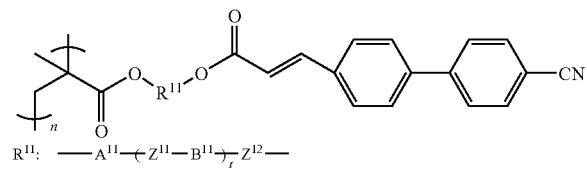

$R^{11}$: —$A^{11}$—($Z^{11}$—$B^{11}$)$_t$—$Z^{12}$— in which $A^{11}$ and $B^{11}$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —CH$_2$—CH$_2$—, —COO—, —OOC—, or a covalent single bond;

t: an integer of 0 to 4;

$R^{12}$: a lower alkyl; and n: an integer of 4 to 30,000.

As the above-mentioned dimerization-reactive polymers, the compounds (4) to (7) represented by the following formulae can be cited as specific examples:

[Chemical Formula 9]

(4)

(5)

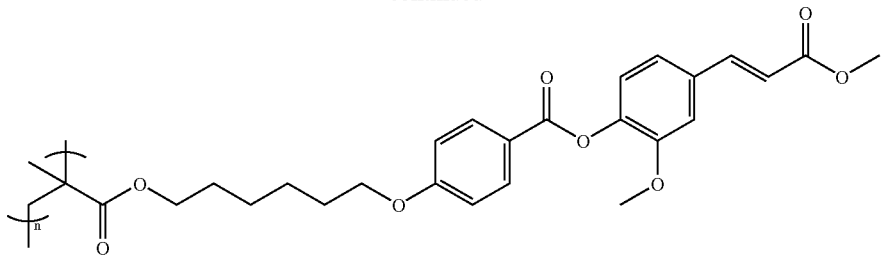

(6)

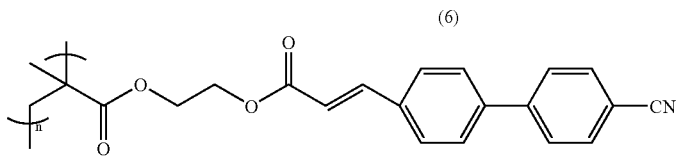

(7)

In the present invention, a photo dimerization-reactive site or substituent can be variously selected as the photo-dimerization-reactive compound from the above-mentioned compounds in accordance with required properties. One kind of the photo-dimerization-reactive compound may be used alone or a combination of two or more kinds thereof can be used.

The photoreactive material using photo-dimerization reaction may contain additives besides the above-mentioned photo-dimerization-reactive compound as long as the photo-aligning of the photo alignment layer is not hindered. Examples of the additives include a polymerization initiator and a polymerization inhibitor.

It is advisable to select the polymerization initiator or the polymerization inhibitor appropriately from generally-known compounds in accordance with the kind of the photo-dimerization-reactive compound and then use the selected one. The added amount of the polymerization initiator or the polymerization inhibitor is preferably from 0.001 to 20% by weight, more preferably from 0.1 to 5% by weight of the photo-dimerization-reactive compound. If the added amount of the polymerization initiator or the polymerization inhibitor is too small, the polymerization may not be initiated (or inhibited). Conversely, if the amount is too large, the reaction may be hindered.

As the photoreactive type material utilizing the photo-decomposing reaction, for example, polyimide "RN1199" manufactured by NISSAN CHEMICAL INDUSTRIES, LTD., or the like can be presented.

(Photo-Isomerization Type)

Next, the photo-isomerization type material will be explained. The photo-isomerization type material here is a material to exhibit the anisotropy to the photo alignment layer by generating the photo-isomerization reaction as mentioned above. It is not particularly limited as long as it is a material having such properties. Those including the photo-isomerization-reactive compound to exhibit the anisotropy to the above-mentioned photo alignment layer by generating the photo-isomerization reaction are preferable. Since such a photo-isomerization-reactive compound is included, stable isomers are increased out of a plurality of isomers by the light irradiation, and thereby the anisotropy can be exhibited easily to the photo alignment layer.

The photo-isomerization-reactive compound is not limited to any especial kind if the compound is a material having such properties mentioned above, and is preferably a compound which shows a dichroism having different absorptions depending on the polarization direction thereof and generates photo-isomerization reaction by the light irradiation. By generating the isomerization of the reactive site aligned in the polarization direction of the photo-isomerization-reactive compound having such properties, anisotropy can easily be given to the photo alignment layer.

For the photo-isomerization reaction generated by the photo-isomerization-reactive compound is preferably the cis-trans isomerization reaction. This is because any one of the cis-isomer and the trans-isomer increases by the light irradiation, whereby anisotropy can be given to the photo alignment layer.

Examples of the photo-isomerization-reactive compound used in the invention may be monomolecular compounds or polymerizable monomers polymerizable with light or heat. These should be appropriately selected in accordance with the kind of the used ferroelectric liquid crystal. It is preferable to use any one of the polymerizable monomers since the monomer gives anisotropy to the photo alignment layer by the light irradiation and subsequently the monomer is polymerized, whereby the anisotropy can be made stable. Of such polymerizable monomers, preferable is an acrylate monomer or a methacrylate monomer since the monomer gives anisotropy to the photo alignment layer and subsequently the monomer can easily be polymerized in the state that the anisotropy is kept good.

The polymerizable monomer may be a monofunctional monomer or a polyfunctional monomer. A bifunctional monomer is preferable since the anisotropy of the photo alignment layer, based on the polymerization, becomes more stable.

Specific examples of such a photo-isomerization-reactive compound include compounds having a cis-trans isomerization-reactive skeleton, such as an azobenzene skeleton or a stilbene skeleton.

In this case, the number of the cis-trans isomerization-reactive skeleton(s) may be one or more, and is preferably two since the alignment of the ferroelectric liquid crystal is easily controlled.

The cis-trans isomerization-reactive skeleton(s) may have a substituent in order to make interaction thereof with the liquid crystal molecules higher. The substituent is not limited to any especial kind if the substituent can make the interaction with the liquid crystal molecules high and further does not hinder the alignment of the cis-trans isomerization-reactive skeleton(s). Examples thereof include a carboxyl group, a sodium sulfonate group, and a hydroxyl group. These skeleton structures can be appropriately selected in accordance with the kind of the used ferroelectric liquid crystal.

The photo-isomerization-reactive compound may have a group containing many π electrons in the molecule, such as an aromatic hydrocarbon group, besides the cis-trans isomerization-reactive skeleton in order to make the interaction with the liquid crystal molecules higher. The cis-trans isomerization-reactive skeleton and the aromatic hydrocarbon group may be bonded to each other through a bonding group. The bonding group is not limited to any especial kind if the group can make the interaction with the liquid crystal molecules high. Examples thereof include —COO—, —OCO—, —O—, —C≡C—, —CH$_2$—CH$_2$—, —CH$_2$O—, and —OCH$_2$—.

In the case of using a polymerizable monomer as the photo-isomerization-reactive compound, it is preferable that the monomer has, as its side chain, the above-mentioned cis-trans isomerization-reactive skeleton. When the monomer has, as its side chain, the cis-trans isomerization-reactive skeleton, the advantageous effect of the anisotropy given to the photo alignment layer becomes larger and this compound becomes particularly suitable for the control of the alignment of the ferroelectric liquid crystal. In this case, it is preferable that the above-mentioned aromatic hydrocarbon group and the bonding group contained in the molecule are contained, together with the cis-trans isomerization-reactive skeleton, in the side chain so as to make the interaction with the liquid crystal molecules high.

The side chain of the polymerizable monomer may have, as a spacer, an aliphatic hydrocarbon group such as an alkylene group so that the cis-trans isomerization-reactive skeleton can easily be aligned.

Of the above-mentioned photo-isomerization-reactive compounds of monomolecular compounds and polymerizable monomers, any compound having in the molecule thereof an azobenzene skeleton is preferable as the photo-isomerization-reactive compound used in the present invention. This is because the azobenzene skeleton interacts highly with the liquid crystal molecules and is particularly suitable for the control of the alignment of the ferroelectric liquid crystal since the skeleton contains many π electrons.

Hereinafter, the reason why the anisotropy can be exhibited to the photo alignment layer by generating the photo-isomerization reaction with the azobenzene skeleton will be explained. First, when the azobenzene skeleton is irradiated with linearly polarized ultraviolet rays, the azobenzene skeleton of a trans isomer, as shown in the below formula, in which its molecule long axis is aligned in the polarization direction, is changed to the cis isomer thereof.

[Chemical Formula 10]

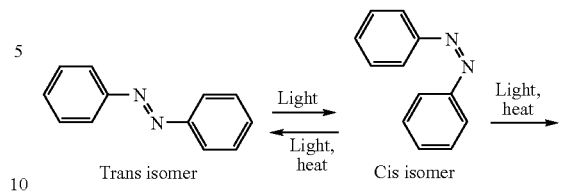

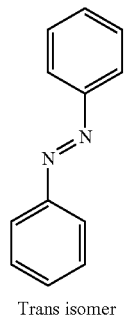

Trans isomer

Since the cis isomer of the azobenzene skeleton is more chemically unstable than trans isomers thereof, the cis isomer returns thermally to any one of the trans isomers or absorbs visible rays to returns thereto. At this time, it happens with the same possibility whether the cis isomer turns to the trans isomer at the left side or the trans isomer at the right side in above formula. Accordingly, when the azobenzene skeleton continues to absorb ultraviolet rays, the ratio of the trans isomer at the right side increases so that the average alignment direction of the azobenzene skeleton becomes perpendicular to the polarized ultraviolet ray direction. In the present invention, this phenomenon is used to make polarization directions of azobenzene skeletons consistent with each other, thereby giving anisotropy to the photo alignment layer to control the alignment of liquid crystal molecules on the layer.

An example of a monomolecular compound out of the compounds each having in the molecule thereof an azobenzene skeleton may be a compound represented by the following formula:

[Chemical Formula 11]

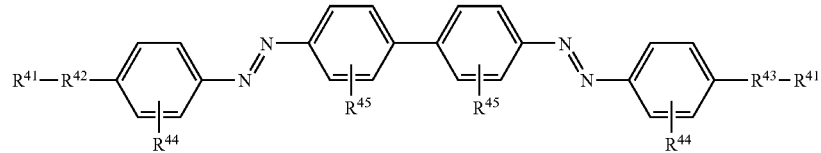

In the above formula, each $R^{41}$ independently represent a hydroxy group; $R^{42}$ represents a linking group represented by $-(A^{41}-B^{41}-A^{41})_m-(D^{41})_n-$ and $R^{43}$ represents a linking group represented by $(D^{41})_n\text{-}(A^{41}\text{-}B^{41}\text{-}A^{41})_m\text{-}$, in which $A^{41}$ represents a bivalent hydrocarbon group, $B^{41}$ represents —O—, —COO—, —OCO—, —CONH—, —NHCO—, —NH-COO— or —OCONH—, m represents an integer of 0 to 3, $D^{41}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{44}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{45}$ independently represents a carboxy group, a sulfo group, a nitro group, an amino group or a hydroxy group provided that the carboxy group or the sulfo group may be combined with an alkali metal to form a salt.

tioned formula having a high alignment limiting force with respect to a liquid crystal molecule is useful as a constituent material for a photo alignment layer, it can hardly be used as a material for a photo alignment layer due to the problem of insufficiency in stability. In the present invention, since the reactive liquid crystal providing the above-mentioned reactive liquid crystal layer can stabilize the monomolecular compound having an azobenzene skeleton, by laminating the reactive liquid crystal layer on the photo alignment layer, the monomolecular compound having an azobenzene skeleton can be used stably as a constituent material for a photo alignment layer.

An example of the polymerizable monomer having as its side chain the azobenzene skeleton may be a compound represented by the following formula:

[Chemical Formula 13]

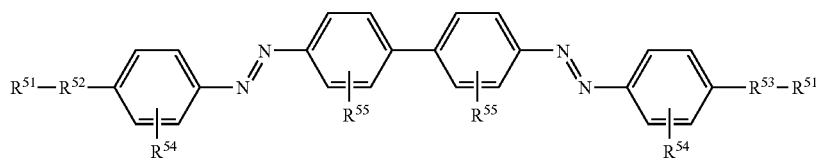

Specific examples of the compound represented by the above-mentioned formula include the following compounds:

[Chemical Formula 12]

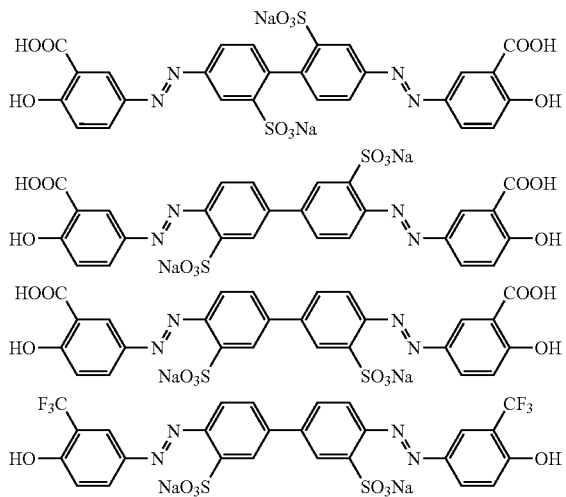

Conventionally, although the monomolecular compound having the azobenzene skeleton shown by the above-men- In the above formula, each $R^{51}$ independently represents a (meth) acryloyloxy group, a (meth) acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{52}$ represents a linking group represented by $\text{-}(A^{51}\text{-}B^{51}\text{-}A^{51})_m\text{-}(D^{51})_n\text{-}$ and $R^{53}$ represents a linking group represented by $(D^{51})_n\text{-}(A^{51}\text{-}B^{51}\text{-}A^{51})_m\text{-}$, in which $A^{51}$ represents a bivalent hydrocarbon group, $B^{51}$ represents —O—, —COO—, —OCO—, —CONH—, —NHCO—, —NHCOO— or —OCONH—, m represents an integer of 0 to 3, $D^{51}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{54}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{55}$ independently represents a carboxy group, a sulfo group, a nitro group, an amino group or a hydroxy group provided that the carboxy group or the sulfo group may be combined with an alkali metal to form a salt.

A specific example of the compound represented by the above-mentioned formula is the following compound:

[Chemical Formula 14]

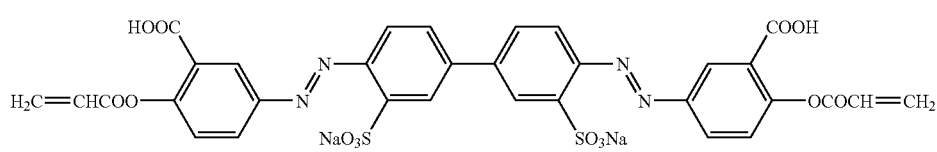

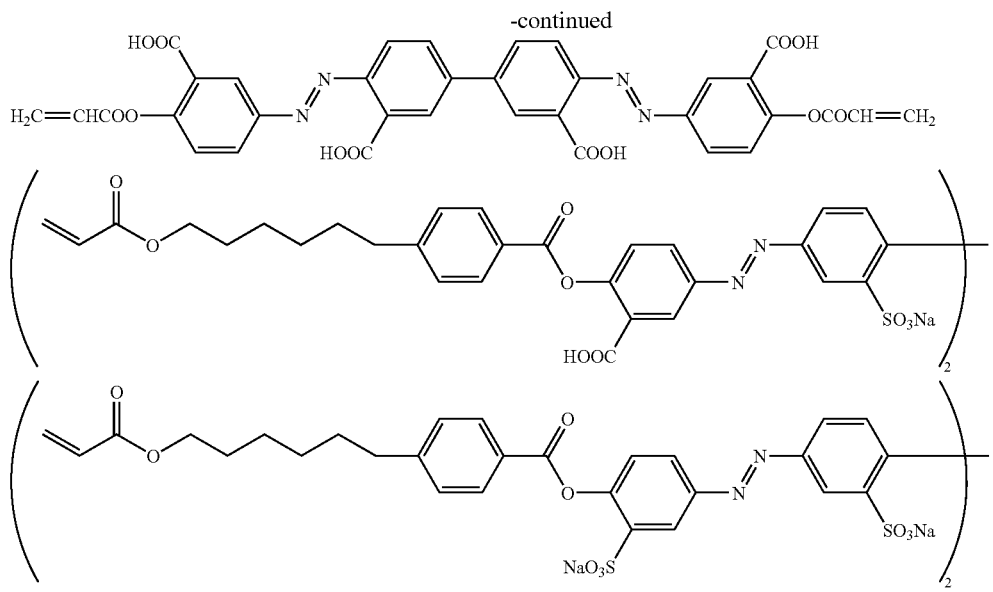

-continued

In the present invention, the cis-trans isomerization-reactive skeleton or substituent can be variously selected from the above-mentioned photo-isomerization-reactive compounds in accordance with required properties. One kind of the photo-isomerization-reactive compound may be used alone or a combination of two or more kinds thereof can be used.

Additives, besides the above-mentioned photo-isomerization-reactive compound, may be contained as constituent materials of the photo alignment layer used in the present invention as long as the photoaligning of the photo alignment layer is not hindered. In the case of using a polymerizable monomer as the photo-isomerization-reactive compound, examples of the additives include a polymerization initiator and a polymerization inhibitor.

It is advisable to select the polymerization initiator or the polymerization inhibitor appropriately from generally-known compounds in accordance with the kind of the photo-isomerization-reactive compound and then use the selected one. The added amount of the polymerization initiator or the polymerization inhibitor is preferably from 0.001 to 20%, more preferably from 0.1 to 5% by weight of the photo-isomerization-reactive compound. If the added amount of the polymerization initiator or the polymerization inhibitor is too small, the polymerization may not be initiated (or inhibited). Conversely, if the amount is too large, the reaction may be hindered.

(Photo Alignment Treatment Method)

Next, the photo alignment treatment method will be explained. First, a coating solution prepared by diluting the constituent materials of the above-mentioned photo alignment layer with an organic solvent is coated onto the surface facing the liquid crystal layer of the second substrate provided with the second electrode layer, and dried. In this case, the content of the photo-dimerization-reactive compound or the photo-isomerization-reactive compound in the coating solution is preferably in a range of 0.05 to 10% by weight, and it is more preferably in a range of 0.2 to 2% by weight. In the case the content is fewer than the range, it is difficult to exhibit the appropriate anisotropy to the alignment layer. On the contrary, if the content is more than the range, a homogeneous coating layer can hardly be formed due to the high viscosity of the coating solution.

The coating method which can be used is spin coating, roll coating, rod bar coating, spray coating, air knife coating, slot die coating, wire bar coating or the like.

The thickness of the layer obtained by the coating the constituent material is preferably from 1 nm to 1000 nm, more preferably from 3 nm to 100 nm. If the thickness of the layer is thinner than the range, a sufficient photoaligning may not be obtained. Conversely, if the thickness is thicker than the range, resulting costs may not be preferred.

The resultant layer causes photo-excitation reaction by the light irradiation the polarization of which is controlled, whereby anisotropy can be given. The wavelength range of the radiated light should be appropriately selected in accordance with the constituent material of the used photo alignment layer, and is preferably the range of ultraviolet ray wavelengths, that is, the range of 100 nm to 400 nm, more preferably the range of 250 nm to 380 nm. The polarizing direction is not particularly limited as long as it can generate the photo-excitation reaction.

Furthermore, in the case of using, as the constituent material of the photo alignment layer, a polymerizable monomer out of the above-mentioned photo-isomerization type reactive compounds, the anisotropy given to the photo alignment layer can be stabilized by subjecting the monomer to photo alignment treatment, and then polymerizing the monomer by heating the monomer.

(3) Second Substrate

The second substrate used in the present invention is not particularly limited as long as it is generally used as a substrate for a liquid crystal display. For example, a glass plate and a plastic plate can be presented preferably.

(4) Second Electrode Layer

The second electrode layer used in the present invention is not particularly limited as long as it is generally used as an electrode layer for a liquid crystal display. At least one of the electrode layers of the first and second alignment treatment substrates is preferably a transparent conductor. Preferred examples of the material of the transparent conductor include such as indium oxide, tin oxide, and indium tin oxide (ITO). In particular, in the case of rendering the liquid crystal display of the invention a liquid crystal display of an active matrix system using TFT, one of the electrode layers of the first and second alignment treatment substrates is rendered a full-face common electrode made of the transparent conductor and the other is rendered an electrode in which gate electrodes and source electrodes are provided in a matrix form and a TFT element and a pixel electrode are provided in a region surrounded by each of the gate electrodes and each of the source electrodes.

The second electrode layer can form a transparent electroconductive film on the second substrate by a physical vapor deposition method (PVD) such as chemical vapor deposition (CVD), sputtering, ion plating, or vacuum deposition and then this is patterned into a matrix form, whereby the gate electrodes and the source electrodes can be obtained.

(5) Colored Layer

In the invention, a colored layer may be formed between the second substrate and the second electrode layer. The formation of the colored layer makes it possible to realize color display by the colored layer.

This colored layer may be formed between the second substrate and the second electrode layer in the second alignment treatment substrate, or may be formed between the first substrate and the first electrode layer in the first alignment treatment substrate, which will be described later.

The colored layer used in the invention is not particularly limited as long as the layer is a layer used generally in color filters. For the colored layer, for example, a photosensitive resin composition containing a red, blue or green pigment that is used in an ordinary pigment dispersing process or the like can be used.

3. First Alignment Treatment Substrate

The first alignment treatment substrate used in the present invention comprises the first substrate, the first electrode layer formed on the first substrate, and the first alignment layer formed on the first electrode layer.

Since the respective first substrate, the first electrode layer, and the first alignment layer are similar to the second substrate, the second electrode layer, and the second alignment layer of the second alignment treatment substrate mentioned above, explanations thereof are omitted herein.

4. Polarizing Plate

The polarizing plate used in the present invention is not particularly limited as long as it allows transmission only in a specific direction out of the wave motions of a light beam, and thus one commonly used as a polarizing plate for a liquid crystal display can be used.

5. Method for Driving the Liquid Crystal Display

The liquid crystal display of the invention can make use of the high speed response properties of the ferroelectric liquid crystal. The display is therefore suitable for being displayed by a field sequential color system, in which each pixel is subjected to time sharing and high speed response properties is in particular required in order to obtain good mobile image display properties. According to the invention, inconveniences in the case of displaying the liquid crystal display by a field sequential color system can be avoided.

The method for driving the liquid crystal display of the invention is not limited to any field sequential method, and color display may be attained by using the above-mentioned colored layer.

The liquid crystal display of the invention is preferably driven by an active matrix system using the thin film transistor (TFT). The adoption of the active matrix system using TFT makes it possible to attain high-quality display since target pixels can be certainly lighted on or off.

The liquid crystal display may be driven in a segment mode.

6. Process for Producing the Liquid Crystal Display

Next, a process for producing the liquid crystal display of the invention is described. The liquid crystal display of the invention can be produced by a method used ordinarily as a liquid crystal display producing process. As one example of the process for producing the liquid crystal display of the invention, a process for producing the liquid crystal display which is based on an active matrix system using TFT elements will be described hereinafter.

First, a transparent electroconductive film is formed on a second substrate by vacuum deposition, so as to prepare a full-face common electrode. Furthermore, a photo alignment layer material is coated onto the common electrode, and the resultant is subjected to photo alignment treatment to form a second alignment layer. A reactive liquid crystal layer forming solution is coated on this second alignment layer, so as to align the reactive liquid crystal, and then the liquid crystal is fixed to form a reactive liquid crystal layer. In this way, a second alignment treatment substrate is prepared. A transparent electroconductive film is patterned into a matrix form on a first substrate, thereby forming gate electrodes and source electrodes. TFT elements and pixel electrodes are then set up thereon. Furthermore, a photo alignment layer material is coated onto the gate electrodes, the source electrodes, the TFT electrodes and the pixel electrodes, and then the resultant is subjected to photo alignment treatment to form a first alignment layer. In this way, a first alignment treatment substrate is prepared. Next, beads are dispersed, as spacers, onto the first alignment layer of the first alignment treatment substrate, and then a sealing agent is coated onto the periphery thereof. The reactive liquid crystal layer of the second alignment treatment substrate and the first alignment layer of the first alignment treatment substrate are provided to oppose to each other and adhered. The substrates are then thermally compressed. A capillary effect is used to inject a ferroelectric liquid crystal, in an isotropic liquid state, into an injecting opening therein. The injecting opening is sealed up with an ultraviolet curing resin or the like. Thereafter, the ferroelectric liquid crystal is slowly cooled so as to be aligned. Polarizing plates are attached to the upper and the lower of the thus-obtained liquid crystal cell. In this way, a liquid crystal display of the invention can be yielded.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

The invention will be described in more detail by way of the following working examples and comparative examples.

Example 1

A 2% by mass solution of a photo-dimerization reaction type photo alignment layer material (trade name: ROP 103, manufactured by Rolic Technologies Ltd.) in cyclopentanone was applied onto two glass substrates, each coated with ITO, by spin coating at a rotation number of 4000 rpm for 30 seconds. The resultants were dried on a hot plate at 130° C. for 15 minutes, and were then exposed to polarized ultraviolet rays at 25° C. at 100 mJ/cm$^2$. Furthermore, a 2% by mass solution of a reactive liquid crystal (trade name: ROF 5101, manufactured by Rolic Technologies Ltd.), containing an acrylate monomer, in cyclopentanone was applied onto one of the glass substrates by spin coating at a rotation number of 4000 rpm for 30 seconds, so as to form a laminate. The laminate was dried at 55° C. for 3 minutes. Thereafter, the resultant was exposed to non-polarized ultraviolet rays at 55° C. at 1000 mJ/cm². Thereafter, spacers 1.5 µm in size were scattered onto one of the substrates. A sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to the electrode layer of the reactive liquid crystal layer side, the molecular direction of the ferroelectric liquid crystal was changed by about 2 times the tilt angle. The ratio of the molecules of the ferroelectric liquid crystal in which the molecular direction was changed by about 2 times the tilt angle was approximately 75% of all the molecules.

Comparative Example 1

A 2% by mass solution of a photo-dimerization reaction type photo alignment layer material (trade name: ROP 103, manufactured by Rolic Technologies Ltd.) in cyclopentanone was applied onto two glass substrates, each coated with ITO, by spin coating at a rotation number of 4000 rpm for 30 seconds. The resultants were dried on a hot plate at 130° C. for 15 minutes, and were then exposed to polarized ultraviolet rays at 25° C. at 100 mJ/cm². Thereafter, spacers 1.5 µm in size were scattered onto one of the substrates. A sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to the electrode layer of the reactive liquid crystal layer side, the molecular direction of part of the ferroelectric liquid crystal was changed by about 2 times the tilt angle. However, the molecular direction of some ferroelectric liquid crystal was not changed. The ratio of the molecules of the ferroelectric liquid crystal in which the molecular direction was changed by about 2 times the tilt angle was approximately 50% of all the molecules.

Example 2

A 2% by mass solution of a photo-dimerization reaction type photo alignment layer material (trade name: ROP 102, manufactured by Rolic Technologies Ltd.) in cyclopentanone was applied onto two glass substrates, each coated with ITO, by spin coating at a rotation number of 4000 rpm for 30 seconds. The resultants were dried on a hot plate at 130° C. for 15 minutes, and were then exposed to polarized ultraviolet rays at 25° C. at 100 mJ/cm². Furthermore, a 2% by mass solution of a reactive liquid crystal (trade name: ROF 5101, manufactured by Rolic Technologies Ltd.), containing an acrylate monomer, in cyclopentanone was applied onto one of the glass substrates by spin coating at a rotation number of 4000 rpm for 30 seconds, so as to form a laminate. The laminate was dried at 55° C. for 3 minutes. Thereafter, the resultant was exposed to non-polarized ultraviolet rays at 55° C. at 1000 mJ/cm². Thereafter, spacers 1.5 µm in size were scattered onto one of the substrates. A sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to the electrode layer of the reactive liquid crystal layer side, the molecular direction of the ferroelectric liquid crystal was changed by about 2 times the tilt angle. The ratio of the molecules of the ferroelectric liquid crystal in which the molecular direction was changed by about 2 times the tilt angle was approximately 80% of all the molecules.

Comparative Example 2

A 2% by mass solution of a photo-dimerization reaction type photo alignment layer material (trade name: ROP 102, manufactured by Rolic Technologies Ltd.) in cyclopentanone was applied onto two glass substrates, each coated with ITO, by spin coating at a rotation number of 4000 rpm for 30 seconds. The resultants were dried on a hot plate at 130° C. for 15 minutes, and were then exposed to polarized ultraviolet rays at 25° C. at 100 mJ/cm². Thereafter, spacers 1.5 µm in size were scattered onto one of the substrates. A sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to one of the electrode layers, the molecular direction of part of the ferroelectric liquid crystal was changed by about 2 times the tilt angle. However, the molecular direction of some ferroelectric liquid crystal was not changed. The ratio of the molecules of the ferroelectric liquid crystal in which the molecular direction was changed by about 2 times the tilt angle was approximately 50% of all the molecules.

Example 3

A 2% by mass solution of a photo-dimerization reaction type photo alignment layer material (trade name: ROP 102, manufactured by Rolic Technologies Ltd.) in cyclopentanone was applied onto a glass substrates, coated with ITO, by spin coating at a rotation number of 4000 rpm for 30 seconds. A 2% by mass solution of a photo-dimerization reaction type photo alignment layer material (trade name: ROP 103, manufactured by Rolic Technologies Ltd.) in cyclopentanone was applied onto a glass substrates, coated with ITO, by spin coating at a rotation number of 4000 rpm for 30 seconds. The two substrates were dried on a hot plate at 130° C. for 15 minutes, and were then exposed to polarized ultraviolet rays at 25° C. at 100 mJ/cm². Furthermore, onto the substrate on which the photo alignment layer material ROP 102 was coated, a 2% by mass solution of a reactive liquid crystal (tradename: ROF 5101, manufactured by Rolic Technologies Ltd.), containing an acrylate monomer, in cyclopentanone was applied by spin coating at a rotation number of 4000 rpm for 30 seconds, so as to form a laminate. The laminate was dried at 55° C. for 3 minutes. Thereafter, the resultant was exposed to non-polarized ultraviolet rays at 55° C. at 1000 mJ/cm². Thereafter, spacers 1.5 μm in size were scattered onto one of the substrates and a sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to the electrode layer of the reactive liquid crystal layer side, the molecular direction of the ferroelectric liquid crystal was changed by about 2 times the tilt angle. The ratio of the molecules of the ferroelectric liquid crystal in which the molecular direction was changed by about 2 times the tilt angle was approximately 80% of all the molecules.

Example 4

A 2% by mass solution of a photo-dimerization reaction type photo alignment layer material (trade name: ROP 102, manufactured by Rolic Technologies Ltd.) in cyclopentanone was applied onto a glass substrates, coated with ITO, by spin coating at a rotation number of 4000 rpm for 30 seconds. A 2% by mass solution of a photo-dimerization reaction type photo alignment layer material (trade name: ROP 103, manufactured by Rolic Technologies Ltd.) in cyclopentanone was applied onto a glass substrates, coated with ITO, by spin coating at a rotation number of 4000 rpm for 30 seconds. The two substrates were dried on a hot plate at 130° C. for 15 minutes, and were then exposed to polarized ultraviolet rays at 25° C. at 100 mJ/cm². Furthermore, onto the substrate on which the photo alignment layer material ROP 102 was coated, a 2% by mass solution of a reactive liquid crystal (trade name: ROF 5102, manufactured by Rolic Technologies Ltd.), containing an acrylate monomer, in cyclopentanone was applied by spin coating at a rotation number of 4000 rpm for 30 seconds, so as to form a laminate. The laminate was dried at 55° C. for 3 minutes. Thereafter, the resultant was exposed to non-polarized ultraviolet rays at 55° C. at 1000 mJ/cm². Thereafter, spacers 1.5 μm in size were scattered onto one of the substrates and a sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to the electrode layer of the reactive liquid crystal layer side, the molecular direction of the ferroelectric liquid crystal was changed by about 2 times the tilt angle. The ratio of the molecules of the ferroelectric liquid crystal in which the molecular direction was changed by about 2 times the tilt angle was approximately 88% of all the molecules.

Example 5

A 2% by mass solution of a photo-dimerization reaction type photo alignment layer material (trade name: ROP 102, manufactured by Rolic Technologies Ltd.) in cyclopentanone was applied onto a glass substrates, coated with ITO, by spin coating at a rotation number of 4000 rpm for 30 seconds. A 2% by mass solution of a photo-dimerization reaction type photo alignment layer material (trade name: ROP 103, manufactured by Rolic Technologies Ltd.) in cyclopentanone was applied onto a glass substrates, coated with ITO, by spin coating at a rotation number of 4000 rpm for 30 seconds. The two substrates were dried on a hot plate at 130° C. for 15 minutes, and were then exposed to polarized ultraviolet rays at 25° C. at 100 mJ/cm². Furthermore, onto the substrate on which the photo alignment layer material ROP 103 was coated, a 2% by mass solution of a reactive liquid crystal (tradename: ROF 5101, manufactured by Rolic Technologies Ltd.), containing an acrylate monomer, in cyclopentanone was applied by spin coating at a rotation number of 4000 rpm for 30 seconds, so as to form a laminate. The laminate was dried at 55° C. for 3 minutes. Thereafter, the resultant was exposed to non-polarized ultraviolet rays at 55° C. at 1000 mJ/cm². Thereafter, spacers 1.5 μm in size were scattered onto one of the substrates and a sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to the electrode layer of the reactive liquid crystal layer side, the molecular direction of the ferroelectric liquid crystal was changed by about 2 times the tilt angle. The ratio of the molecules of the ferroelectric liquid crystal in which the molecular direction was changed by about 2 times the tilt angle was approximately 99.7% of all the molecules.

Example 6

A 2% by mass solution of a photo-dimerization reaction type photo alignment layer material (trade name: ROP 102, manufactured by Rolic Technologies Ltd.) in cyclopentanone was applied onto a glass substrates, coated with ITO, by spin coating at a rotation number of 4000 rpm for 30 seconds. A 2% by mass solution of a photo-dimerization reaction type photo alignment layer material (trade name: ROP 103, manufactured by Rolic Technologies Ltd.) in cyclopentanone was applied onto a glass substrates, coated with ITO, by spin coating at a rotation number of 4000 rpm for 30 seconds. The two substrates were dried on a hot plate at 130° C. for 15 minutes, and were then exposed to polarized ultraviolet rays at 25° C. at 100 mJ/cm². Furthermore, onto the substrate on which the photo alignment layer material ROP 103 was coated, a 2% by mass solution of a reactive liquid crystal (tradename: ROF 5102, manufactured by Rolic Technologies Ltd.), containing an acrylate monomer, in cyclopentanone was applied by spin coating at a rotation number of 4000 rpm for 30 seconds, so as to form a laminate. The laminate was dried at 55° C. for 3 minutes. Thereafter, spacers 1.5 μm in size were scattered onto one of the substrates and the resultant was exposed to non-polarized ultraviolet rays at 55° C. at 1000 mJ/cm². Thereafter, a sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to the electrode layer of the reactive liquid crystal layer side, the molecular direction of the ferroelectric liquid crystal was changed by about 2 times the tilt angle. The ratio of the molecules of the ferroelectric liquid crystal in which the molecular direction was changed by about 2 times the tilt angle was approximately 92.8% of all the molecules.

Example 7

As a liquid crystal material of a reactive liquid crystal layer, a compound A represented by a formula illustrated below was used.

[Chemical Formula 15]

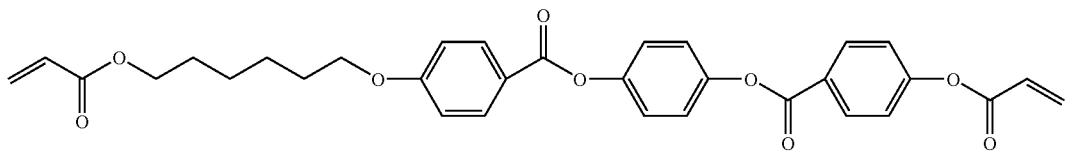

A 2% by mass solution of a photo-dimerization reaction type photo alignment layer material (trade name: ROP 103, manufactured by Rolic Technologies Ltd.) in cyclopentanone was applied onto two glass substrates, each coated with ITO, by spin coating at a rotation number of 4000 rpm for 30 seconds. The resultants were dried in an oven at 180° C. for 10 minutes, and were then exposed to polarized ultraviolet rays at 25° C. at 100 mJ/cm². Furthermore, a 2% by mass solution of the compound A dissolved in cyclopentanone was applied onto one of the glass substrates by spin coating at a rotation number of 4000 rpm for 30 seconds, so as to form a laminate. The laminate was dried at 55° C. for 3 minutes. Thereafter, the resultant was exposed to non-polarized ultraviolet rays at 55° C. at 1000 mJ/cm². Thereafter, spacers 1.5 μm in size were scattered onto one of the substrates. A sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to the electrode layer of the reactive liquid crystal layer side, the molecular direction of the ferroelectric liquid crystal was changed by about 2 times the tilt angle. The ratio of the molecules of the ferroelectric liquid crystal in which the molecular direction was changed by about 2 times the tilt angle was approximately 90% of all the molecules.

Example 8

A 2% by mass solution of a photo-dimerization reaction type photo alignment layer material (trade name: ROP 103, manufactured by Rolic Technologies Ltd.) in cyclopentanone was applied onto two glass substrates, each coated with ITO, by spin coating at a rotation number of 4000 rpm for 30 seconds. The resultants were dried at 130° C. in an oven for 15 minutes, and were then exposed to polarized ultraviolet rays at 25° C. at 100 mJ/cm². Furthermore, a 2% by mass solution of a reactive liquid crystal (trade name: ADEKA CHIRACOL PLC-7209, manufactured by Asahi Denka Co., Ltd.), containing an acrylate monomer, was applied onto one of the glass substrates by spin coating at a rotation number of 4000 rpm for 30 seconds, so as to form a laminate. The laminate was dried at 55° C. for 3 minutes. Thereafter, the resultant was exposed to non-polarized ultraviolet rays at 55° C. at 1000 mJ/cm². Thereafter, spacers 1.5 μm in size were scattered onto one of the substrates. A sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to the electrode layer of the reactive liquid crystal layer side, the molecular direction of the ferroelectric liquid crystal was changed by about 2 times the tilt angle. The ratio of the molecules of the ferroelectric liquid crystal in which the molecular direction was changed by about 2 times the tilt angle was approximately 90% of all the molecules.

Example 9

A 2% by mass solution of a photo-dimerization reaction type photo alignment layer material (trade name: ROP 103, manufactured by Rolic Technologies Ltd.) in cyclopentanone was applied onto two glass substrates, each coated with ITO, by spin coating at a rotation number of 4000 rpm for 30 seconds. The resultants were dried at 130° C. in an oven for 15 minutes, and were then exposed to polarized ultraviolet rays at 25° C. at 100 mJ/cm². Furthermore, a 2% by mass solution of a reactive liquid crystal (trade name: ADEKA CHIRACOL PLC-7183, manufactured by Asahi Denka Co., Ltd.), containing an acrylate monomer, was applied onto one of the glass substrates by spin coating at a rotation number of 4000 rpm for 30 seconds, so as to form a laminate. The laminate was dried at 55° C. for 3 minutes. Thereafter, the resultant was exposed to non-polarized ultraviolet rays at 55° C. at 1000 mJ/cm². Thereafter, spacers 1.5 µm size were scattered onto one of the substrates. A sealing material was coated onto the other substrate with a seal dispenser. The substrates were fabricated into a state that the substrates were made parallel to the direction of the radiated polarized ultraviolet rays, and then thermally compressed onto each other. A ferroelectric liquid crystal, "R2301" manufactured by AZ Electronic Materials was used. The ferroelectric liquid crystal was caused to adhere onto the upper of the injecting opening. An oven was used to inject the liquid crystal at a temperature higher than the nematic phase/isotropic phase transition temperature by 10 to 20° C., and then the temperature was slowly returned to room temperature. When a negative voltage was applied to the electrode layer of the reactive liquid crystal layer side, the molecular direction of the ferroelectric liquid crystal was changed by about 2 times the tilt angle. The ratio of the molecules of the ferroelectric liquid crystal in which the molecular direction was changed by about 2 times the tilt angle was approximately 95% of all the molecules.

The invention claimed is:

1. A liquid crystal display comprising:
   a first alignment treatment substrate having a first substrate, a first electrode layer formed on the first substrate, and a first alignment layer formed on the first electrode layer; and
   a second alignment treatment substrate having a second substrate, a second electrode layer formed on the second substrate, a second alignment layer formed on the second electrode layer, and a reactive liquid crystal layer formed on the second alignment layer and obtained by fixing a reactive liquid crystal;
   in which the first alignment treatment substrate and the second alignment treatment substrate are provided to have the first alignment layer and the reactive liquid crystal layer face to each other; and
   in which a ferroelectric liquid crystal is held between the first alignment layer and the reactive liquid crystal layer; wherein the ferroelectric liquid crystal exhibits mono- stability, and further wherein, when a negative voltage is applied to the second electrode layer, a molecular direction of the ferroelectric liquid crystal is changed by about 2 times a tilt angle of the ferroelectric liquid crystal parallel to a surface of the first alignment treatment substrate.

2. The liquid crystal display according to claim 1, wherein the reactive liquid crystal shows a nematic phase.

3. The liquid crystal display according to claim 1, wherein the reactive liquid crystal has a polymerizable liquid crystal monomer.

4. The liquid crystal display according to claim 3, wherein the polymerizable liquid crystal monomer is a monoacrylate monomer or a diacrylate monomer.

5. The liquid crystal display according to claim 4, wherein the diacrylate monomer is a compound represented by the below-mentioned formula (1):

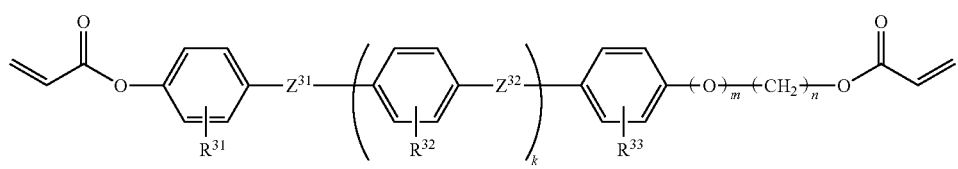

in which, $Z^{31}$ and $Z^{32}$ in the formula are each independently and directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; $R^{31}$, $R^{32}$ and $R^{33}$ are each independently a hydrogen or an alkyl having 1 to 5 carbon atoms; k and m are each 0 or 1; and n is an integer in a range of 2 to 8.

6. The liquid crystal display according to claim 4, wherein the diacrylate monomer is a compound represented by the below-mentioned formula (2):

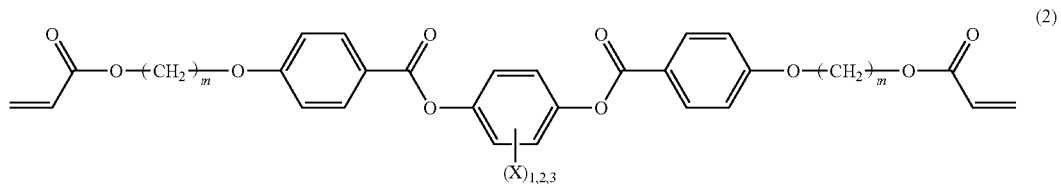

in which, X in the formula is a hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro; and m is an integer in a range of 2 to 20.

7. The liquid crystal display according to claim 1, wherein the first alignment layer and the second alignment layer is a photo alignment layer.

8. The liquid crystal display according to claim 7, wherein a constituent material for the photo alignment layer is a photoreactive type material to exhibit anisotropy to the photo alignment layer by generating a photoreaction, or a photo-isomerization type material including a photo-isomerization-reactive compound to exhibit anisotropy to the photo alignment layer by generating a photo-isomerization reaction.

9. The liquid crystal display according to claim 1, wherein the first alignment treatment substrate is a TFT substrate having a thin film transistor (TFT) formed on the first substrate, and the second alignment treatment substrate is a common electrode substrate in which the second electrode layer is a common electrode.

10. The liquid crystal display according to claim 1, wherein the liquid crystal display is driven by an active matrix system using the thin film transistor.

11. The liquid crystal display according to claim 1, wherein the liquid crystal display is displayed by a field sequential color system.

* * * * *